United States Patent [19]

Wu et al.

[11] Patent Number: 5,346,954
[45] Date of Patent: Sep. 13, 1994

[54] THERMOPLASTIC AND THERMOSET POLYMER COMPOSITIONS

[75] Inventors: Jiun-Chen Wu, Holland; William J. Work, Huntington Valley; David L. Dunkelberger, Newtown; Newman M. Bortnick, Oreland, all of Pa.

[73] Assignee: Rohm and Haas Company, Philadelphia, Pa.

[21] Appl. No.: 977,592

[22] Filed: Nov. 17, 1992

Related U.S. Application Data

[60] Division of Ser. No. 679,411, Apr. 2, 1991, Pat. No. 5,237,004, which is a division of Ser. No. 189,340, May 13, 1988, abandoned, which is a continuation-in-part of Ser. No. 922,133, Nov. 18, 1986, abandoned.

[51] Int. Cl.⁵ ............................................. C08L 51/04
[52] U.S. Cl. .................................... 525/85; 525/54.2; 525/64; 525/66; 525/67; 525/71; 525/81; 525/82; 525/931; 525/932
[58] Field of Search ............... 525/85, 81, 71, 64, 525/66, 67, 54.2, 227, 228, 931, 932; 526/909

[56] References Cited

U.S. PATENT DOCUMENTS

| | | |
|---|---|---|
| 3,005,801 | 10/1961 | Erickson et al. . |
| 3,415,796 | 12/1968 | Souder et al. . |
| 3,450,796 | 6/1969 | Griffin . |
| 3,562,235 | 2/1971 | Ryan . |
| 3,655,825 | 4/1972 | Souder et al. . |
| 3,671,610 | 6/1972 | Amagi et al. . |
| 3,725,367 | 4/1973 | Kemp ............................ 526/909 |
| 3,751,527 | 8/1973 | Bortnick . |
| 3,793,402 | 2/1974 | Owens . |
| 3,808,180 | 4/1974 | Owens . |
| 3,883,617 | 5/1975 | Krieg et al. . |
| 3,886,232 | 5/1975 | Tamaka et al. . |
| 3,985,703 | 10/1976 | Fery et al. . |
| 3,992,485 | 11/1976 | Kosugi et al. . |
| 3,992,486 | 11/1976 | Lang . |
| 4,000,216 | 12/1976 | Lang . |
| 4,108,923 | 8/1978 | Mast . |
| 4,165,153 | 8/1979 | Land . |
| 4,186,120 | 1/1980 | Ugelstad . |
| 4,495,324 | 1/1985 | Chacko et al. . |
| 4,542,171 | 9/1985 | Elser et al. . |
| 4,567,234 | 1/1986 | Meunier . |
| 4,849,480 | 7/1989 | Antonelli et al. . |
| 4,876,311 | 10/1989 | Hennig et al. . |
| 4,885,350 | 12/1989 | Yamishita et al. . |
| 4,914,154 | 4/1990 | Haller et al. . |
| 5,004,785 | 4/1991 | Ida et al. . |

FOREIGN PATENT DOCUMENTS

| | | |
|---|---|---|
| 73450 | 3/1983 | European Pat. Off. . |
| 52-047881 | 4/1977 | Japan . |
| 58-33426 | 2/1983 | Japan . |
| 59-38252 | 3/1984 | Japan . |
| 62-84156 | 4/1987 | Japan . |
| 6410515 | 2/1989 | Japan . |

OTHER PUBLICATIONS

Ugelstad et al–Advances in Colloid & Interface Science, 13 (1980) pp. 101–140.

Primary Examiner—Carman J. Seccuro, Jr.
Attorney, Agent, or Firm—Darryl P. Frickey

[57] ABSTRACT

Polymer particles in a size range between 2 and 15 micrometers, and having a refractive index close to, but not identical with, that of a matrix polymer and optionally having one or more enclosing shells, the outer shell being compatible with the matrix polymer, impart light-diffusing properties to the matrix polymer without degrading its physical properties, while the particles having a closer refractive index match to the matrix polymer impart gloss reduction to the surface of the matrix polymer.

9 Claims, No Drawings

THERMOPLASTIC AND THERMOSET POLYMER COMPOSITIONS

This is a divisional of application Ser. No. 679,411, filed Apr. 2, 1991, now U.S. Pat. No. 5,237,009; which is a Div. of Ser. No. 189,340 filed May 13, 1988, now abandoned; which is a continuation in part of Ser. No. 422,133 filed Nov. 18, 1986, now abandoned.

This invention is concerned with thermoplastic and thermoset polymers compositions having modified optical properties. More particularly, the present invention is concerned with thermoplastic and thermoset compositions which are light-scattering polymer compositions and/or are polymer compositions which have a reduced-gloss or matte surface finish.

BACKGROUND OF THE INVENTION

Light-diffusing polymers are "semi-transparent" or translucent to visible light, that is, they scatter transmitted light, preferably without significantly reducing its intensity. They may be clear or colored, and may be incorporated into clear or colored thermoplastic or thermoset polymer matrices to form light-scattering thermoplastic or thermoset polymer compositions which may be formed into sheets or films of various thicknesses, or into more complex shapes. Such compositions find use as light diffusers in, for example, luminaires, rear projection screens for television or film viewing, decoration, illuminated signs, especially back-lit translucent signs, skylight, lighting fixtures, especially for fluorescent or incandescent lighting, greenhouse glazing, light boxes, drafting tables, automotive sunroofs, artistic applications, such as visual display-case components, antiglow screens for CRT units, twin-wall glazing, covers for automotive lights and many related applications.

Early light diffusers were made from glass, typically by surface treatment such as grinding or etching. Polymeric light diffusers initially used similar processes, or incorporated finely ground inorganic particles, such as titanium dioxide, barium sulfate and silica, into the polymer. Such particles were difficult to disperse evenly, they reduced the light transmission of the polymer unacceptably, and, because they were usually hard, irregular, ground particles, they tended to abrade the processing equipment.

Glass microspheres solved some of the problems associated with other inorganic particles; they were less abrasive because they were spheres, and they allowed greater light transmission, and they shared a tendency with the other inorganic light diffusers to reduce the physical strength of the polymer.

Light-diffusing polymer particles have also been used to introduce light-diffusing properties into transparent matrix polymers. Land, U.S. Pat. No. 4,165,153, teaches incorporating polymer particles having a refractive index preferably at least 0.1 units below that of the matrix polymer. Lang, U.S. Pat. No. 3,992,486, teaches the use of opaque, porous, crosslinked polymer particles smaller than about 30 micrometers ($\mu$m), formed by endopolymerization and having a refractive index preferably above that of the matrix polymer, as an opacifier, flatting agent and pigment as well as a light diffusing agent. Krieg et al., U.S. Pat. No. 3,883,617, teaches precipitating styrene particles within a monomer system during polymerization, and subsequently thermally crosslinking these particles to form light diffusers. As only styrene is taught, no flexibility exists in selecting the refractive index of the particles with respect to the matrix polymer. Kishida et al., in Japanese Patent Publication No. 59-38252, teach suspension-polymerized particles of 10 to 500 $\mu$m diameter as light diffusing particles.

Japanese Patent Publication No. 64-10515 discloses a method for producing a translucent resin comprising mixing fine particles of a bridging polymer in a transparent resin of a base material, said bridging polymer particles having an average diameter of 0.5 to 5 $\mu$m and differing in refractive index of the matrix by 0.05 to 0.3 units. However, the grow-out process taught therein for making the particles suggests that an appreciable quantity of small particles are produced. The reference requires a bridging monomer which is a crosslinking monomer.

Japanese Kokai 62-84156 describes a grow-out process involving polymerization of mixtures of monofunctional and polyfunctional monomers, followed by a staging with a very high concentration of polyfunctional monomers, with oil-soluble initiators onto a preformed seed to form fine granules with a granular diameter of 1-30 $\mu$m, preferably 1-20 $\mu$m, and standard deviation of below 1 $\mu$m, preferably below 0.5 $\mu$m. The Japanese document does not disclose or suggest the use of such particles in thermoplastic or thermoset compositions.

Matte-surface or low-gloss polymers are thermoplastic or thermoset materials which scatter light broadly from the surface instead of having a glossy surface with high reflectance. They may be clear, opaque, or colored, and may be formed into sheets or films of various thicknesses or more complex articles.

Surface alteration of thermoplastics to reduce gloss has been carried out commercially for some years. Manufacturing techniques employed have been the use of specially roughened extruded or calendering rolls, extrusion under conditions producing melt fracture such as is taught for acrylic film in U.S. Pat. No. 3,415,796, and the use of small-particle inorganic fillers, such as silica. The first requires special processing equipment; the second requires materials of low melt flow, placing a load on the extruder, and it is difficult to avoid a patterned or "sharkskin" appearance from excessive melt fracture; the third causes wear on thermoplastic processing machinery, and often detracts from the physical properties of the resultant plastic.

Polymeric modifiers for surface alteration are known to the art. Acrylonitrile-butadiene-styrene (ABS) resins have been manufactured in which one component of the resin is a particulate ABS polymer crosslinked to such an extent that it maintains its shape even during the extrusion process, producing surface-alteration. Similar technology is known for poly(vinyl chloride) (Japanese Kokai 83-33426), but the technology utilizes beads of crosslinked PVC similar in size to the uncrosslinked resin. The height of the surface protrusions is taught to be 1-45 $\mu$m.

Another useful technology is that taught by Lang in U.S. Pat. Nos. 3,992,486 and 4,000,216, wherein an endopolymer is prepared by polymerizing in bulk or in suspension a monomer mixture containing a crosslinking or graftlinking monomer in the presence of a preformed polymer dissolved therein under conditions where the new polymer is formed as particles of rather broad particle size distribution but in the range of at least about 1 to at least about 30 $\mu$m dispersed in a continuous phase of the preformed polymer. These particles dispersed in the preformed polymer are then processed with a suitable polymeric matrix to achieve a desired flatted, matte-surfaced, or low gloss plastic.

Each of the above particles suffers from one or more of the following problems: inflexibility of refractive-index choice, hardness of the particle resulting in poorer impact strength, poor dispersion in the matrix polymer with accompanying degradation of matrix-polymer physical strength, and degradation of light transmission in the matrix polymer. It is an object of the present invention to provide a polymeric additive for thermoplastic or thermoset polymers which reduces one or more of the above problems.

THE INVENTION

We have discovered thermoplastic or thermoset polymer compositions having modified optical properties which comprise a thermoplastic or thermoset polymer and incorporated therein from about 0.1% to about 40% by weight of the total composition of substantially spherical polymer particles having an average diameter of from about 2 to about 15 μm, preferably 2 to 10 μm, more preferably 4 to 10 μm and still more preferably 5 to 10 μm, and having a particle-size distribution such that at least 90% by weight of the particles fall within ±20% of the average particle diameter, the particles being suitable for modifying the transmitted or reflected light-scattering properties of the thermoplastic or thermoset polymer. The spherical polymer particles comprise rubbery alkyl acrylate polymer, the alkyl group having from 2 to 8 carbon atoms, copolymerized with 0 to about 10%, preferably 0 to about 5%, crosslinker, 0 to about 10%, preferably 0 to about 5%, graftlinker and 0 to about 50% of copolymerizable vinyl monomer (based on the total weight of the particles) and optionally one or more polymer shells surrounding the rubbery alkyl acrylate polymer, the outermost of which is compatible with the matrix polymer, which shell(s) comprise 0 to about 40% of the weight of the particles plus shell(s). Thus the spherical polymer particles may comprise only a single polymer phase, i.e. a single-phase polymer, or they may comprise a polymeric core phase, and one or more polymeric shell phase(s) i.e. a core/shell polymer.

In accordance with one aspect of the present invention the polymer composition is a light scattering composition based on a thermoplastic polymer matrix, the spherical polymer particles are present in an amount of from 0.1 to 10% of the total composition weight, the rubbery alkyl acrylate polymer having a refractive index ($n_D^{25}$) within ±0.2 units of, but preferably no closer than ±0.003 units to, the refractive index of the matrix polymer.

It is surprising that the compositions of the present invention demonstrate, under certain circumstances, both light-scattering and reduced-gloss properties. Generally, polymer compositions containing only the one additive are unable to demonstrate both properties at the same time to any appreciable extent. While it is purely speculative, and the invention is in no way to be limited by this explanation, it is believed that the size and uniformity of the additive particles in the polymer compositions of the present invention are responsible for these observed properties.

One procedure for making the spherical polymer particles of the present invention is described and claimed in Ugelstad, U.S. Pat. No. 4,186,120.

(1) SINGLE PHASE POLYMER

When the polymer particles comprise only a single polymeric phase, the particles may be prepared from one or more vinyl monomers, and may be a rubbery or glassy polymer. The spherical polymer particles may be prepared from polymerization or copolymerization of such monomers as diolefins, e.g. butadiene or isoprene; vinyl aromatic monomers, e.g. styrene or chlorostyrene; vinyl esters, e.g. vinyl acetate or vinyl benzoate; acrylonitrile; methacrylonitrile; (meth)acrylate esters, such as methyl methacrylate, butyl methacrylate, phenyl methacrylate, ethyl acrylate, butyl acrylate, 2-ethylhexyl acrylate and benzyl acrylate; vinyl chloride; and other common monomers polymerizable by free-radical initiation.

The preferred particles are spherical polymer particles of rubbery alkyl acrylate polymer, the alkyl group having from 2 to 8 carbon atoms, copolymerized with from 0 to about 10% crosslinking monomer, preferably from 0 to about 5% crosslinking monomer, and from 0 to about 50% other copolymerizable vinyl monomer. The preferred alkyl acrylate is butyl acrylate, and the preferred other copolymerizable vinyl monomer or monomers are more preferably monovinyl monomers, preferably selected from the group consisting of alkyl methacrylates and monovinyl arenes, and still more preferably styrene. Monovinyl arenes, as used herein, include such monoethylenically unsaturated aromatic monomers as styrene, alkylstyrenes such as methylstyrene and ethylstyrene, other substituted vinylbenzenes wherein the substituents do not interfere with polymerization, and similar vinyl polycyclic aromatic monomers. The indicated percentages are by weight (as are all proportions used herein unless otherwise indicated), and are percentages of the total polymer-particle monomer. The alkyl acrylate and any copolymerizable vinyl monomer are selected such that the refractive index of the spherical polymer particle will be within about ±0.2 units, preferably within about ±0.1 units, more preferably within about ±0.05 units, and still more preferably about ±0.03, of the refractive index of the matrix polymer. However, as an exact match between the refractive indices of the spherical polymer particles and matrix polymer will produce an almost completely transparent composition, the refractive index of the spherical polymer particles is preferably no closer than about ±0.003 refractive index units to that of the matrix polymer.

Crosslinking monomers suitable for use as the crosslinker in the spherical polymer particles are well known to those skilled in the art, and are generally monomers copolymerizable with the monounsaturated monomers present, and having polyethylenic unsaturation in which the ethylenically unsaturated groups have approximately equal reactivity, as for example divinylbenzene, glycol di- and trimethacrylates and acrylates, triol triacrylates and methacrylates and the like. The preferred crosslinking monomers are butylene glycol diacrylates. A second class of crosslinking monomer, often referred to as graftlinking monomers, are polyethylenically unsaturated monomers copolymerizable with the monounsaturated monomers present, and having two or more non-conjugated double bonds of differing reactivity, as for example allyl methacrylate, diallyl maleate and allyl acryloxypropionate. The preferred crosslinking monomer from this group is allyl methacrylate. Combinations of both types of crosslinking monomer maybe employed. If crosslinking monomer is employed, it is preferably used at levels from about 0.5 to about 10%, more preferably about 0.1 to about 5%, and most preferably from about 0.1 to about 1%, based on the total monomer weight.

Alternatively, the spherical polymer particle may be crosslinked using other techniques known to those skilled in the art, as for example by post-cure reactions. Such a post-cure reaction may be seen when a copolymer is formed from a monomer having a pendant peroxide group, which is then activated by heating to a temperature higher than that used in the polymerization. The activated peroxide group will promote crosslinking of the spherical polymer particle. In another example, a second free-radical initiator may be added to the polymerization; this second initiator is selected to be stable at the initial polymerization temperature, but to be activated by light or a higher temperature subsequent to the initial polymerization.

The spherical polymer particle may contain residual oligomeric material used in the polymerization process to swell the polymer particles but such oligomeric material has a high enough molecular weight to prevent its diffusion or being extracted during processing or use, and is present at such a low concentration that it has little or no effect upon mechanical properties of the spherical polymer particles or the light-scattering composition.

The spherical polymer particles useful in the present invention have a particle diameter from about 2 to about 15 μm, and a narrow particle size distribution within any particular polymer composition, preferably such that 90% by weight of the particles fall within ±20% of the average particle diameter. If many particles much larger than the desired size are present in the light-scattering composition, the efficiency of diffusion is decreased and the polymer surface is less attractive, while if many undersized particles are present, backscattering increases and overall light transmission decreases. Such a narrow size distribution is readily obtained by emulsion polymerization techniques, but the particles themselves tend to be smaller than 1 μm. Particles at the upper end of the desired size range may be made by suspension polymerization techniques but the size distribution is unacceptably broad. Consequently, although other techniques for preparing particles having the particle size, size distribution and spherical configuration are useful in the present invention, the preferred technique for making them involves preparing uniformly sized small particles by emulsion polymerizing at least one monomer component of the spherical polymer particle to form emulsion polymer particles, swelling the emulsion polymer particles with one or more monomer components of the spherical polymer particle, and polymerizing the monomer within the emulsion polymer particles. The swelling and polymerizing steps may be repeated until the particles have grown to the desired size. A preferred procedure for making the spherical polymer particles involves emulsion polymerizing the initial emulsion polymer particles using conditions which restrict the molecular weight of the polymer that forms, such as by including chain-transfer moderators, e.g., mercaptans, in the polymerization mixture, such that the resulting emulsion particles comprise an easily swellable oligomer. This process may be varied by preparing the initial emulsion polymer particles in the absence of such limiting of the polymer molecular weight, but subsequently conducting one or more of the swelling and polymerizing steps using the conditions which restrict the polymer molecular weight. In this variation the initial emulsion polymer particles do not swell as readily as subsequent, larger particles having a lower overall molecular weight. As in the preferred process above, at least the final polymerization is carried out under conditions which do not so limit the polymer molecular weight.

The above process for growing larger particles from emulsion-sized particles retains much of the size uniformity of the original, emulsion particles, and is capable of increasing the size of the original, emulsion-polymerized polymer by a factor of at least 10 and as much as 1000. A small amount of very small emulsion particles may be observed in the product of these processes, but such particles account for much less than 0.1% of the total particle weight, and do not adversely affect the optical properties of the light-scattering polymer. Related techniques for preparing uniformly sized particles in the desired size range are taught by Ugelstad, U.S. Pat. No. 4,186,120.

The technology disclosed by Ugelstad and applicable to all aspects of the present invention is further discussed in several papers, among them J. Ugelstad and P. C. Mork, Advances in Colloid and Interface Science, 13, 101 (1980). A seed polymer, preferably of oligomeric compositions, is prepared by essentially conventional emulsion techniques. The seed is then swollen by monomer, and conditions are established where no initiation in the water-phase occur and no new polymer particles are formed. Large amounts of monomers are taken up and the particle size range is achieved. The resulting dispersions will settle, but can readily be redispersed by agitation or mixing, so that they can be uniformly added to an appropriate matrix. Alternative techniques have been described by Ugelstad, such as establishing initiation in monomer droplets rather than establishing micelles or agglomerates in the aqueous phase. It is of note that the techniques described by Ugelstad and in our copending European patent application tend to give smaller populations of small particles when the level of styrene in the preferred alkyl acrylate copolymers is low.

Alternative techniques to manufacture of such polymers are disclosed in the literature, although the Ugelstad process is preferred for the alkyl acrylate copolymers preferred in the present invention. Noted are Schwartz et al, U.S. Pat. No. 4,499,828 and Japanese Kokai 62-84156. The latter describes a grow-out process involving polymerization of mixtures of monofunctional and polyfunctional monomers, followed by a staging with a high concentration of polyfunctional monomers, with oil-soluble initiators onto a pre-formed seed to form fine granules with a granular diameter of 1–30 μm, preferably 1–20 μm, and a standard deviation of below 1 micron, preferably below 0.5 μm. The Japanese applications does not teach or demonstrate the use of such particles for use in light-diffusing plastics, and especially avoids mention of control of refractive index to produce particles useful in manufacture of articles with contact clarity.

The finished spherical polymer particles may be isolated from the emulsion in which they are prepared using conventional techniques such as spray-drying, coagulation and the like. They may also be mixed with the matrix polymer by co-isolation in a devolatilizing extruder, as taught by Bortnick in U.S. Pat. No. 3,751,527.

(2) CORE/SHELL POLYMER

When the polymer particles comprise a polymeric core phase and at least one polymeric shell phase, the core may be prepared from a variety of vinyl monomers, and may be a rubbery or glassy polymer. The core may be prepared from polymerization or copolymerization of such monomers as diolefins, e.g. butadiene or isoprene; vinyl aromatic monomers, e.g. styrene or chlorostyrene; vinyl esters, e.g. vinyl acetate or vinyl benzoate; acrylonitrile; methacrylonitrile; (meth)acrylate esters, e.g. methyl methacrylate, butyl methacrylate, phenyl methacrylate, ethyl acrylate, butyl acrylate, 2-ethylhexyl acrylate, and benzyl acrylate; vinyl chloride; and other monomer polymerizable by free-radical initiation.

The shell or shells preferably comprise from about 5 to about 40% of the weight of the core/shell particles.

The preferred core/shell particles comprises individual particles with a diameter from about 2 to about 15 μm, preferably from about 5 to about 10 μm, and a narrow particle-size distribution. The particle size distribution is such that at least 90% by weight of the particles fall within ±20% of the average diameter of the particles; it is understood that the term "particle size distribution" used herein refers to the size range of at least 90% by weight of the particles. The particles have a core of rubbery alkyl acrylate polymer, the alkyl group having from 2 to 8 carbon atoms, copolymerized with from 0 to about 10%, preferably from 0 to about 5%, crosslinking monomer, from 0 to about 10%, preferably from 0 to about 5%, graftlinking monomer, and from 0 to about 50% other copolymerizable vinyl monomer. The preferred alkyl acrylate is butyl acrylate, and the preferred other copolymerizable vinyl monomer or monomers are more preferably monovinyl monomers, preferably selected from the group consisting of alkyl methacrylates and monovinyl arenes, and still more preferably styrene. Monovinyl arenes, as used herein, include such monoethylenically unsaturated aromatic monomers as styrene, alkylstyrenes such as methylstyrene and ethylstyrene, other substituted vinylbenzenes wherein the substitutents do not interfere with polymerization, and similar vinyl polycyclic aromatic monomers. The indicated percentages are by weight (as are all proportions used herein unless otherwise indicated), and are percentages of the total core monomer. The alkyl acrylate and any copolymerizable vinyl monomer are selected such that the refractive index of the core polymer will be within about ±0.2 units, more preferably within about ±0.05 units, and still more preferably within about ±0.03, of the refractive index of the matrix polymer. However, as an exact match between the refractive indices of the core polymer and matrix polymer will produce an almost completely transparent composition, the refractive index of the core polymer is preferably no closer than about ±0.003 refractive index units to that of the matrix polymer.

Crosslinking monomers suitable for use as the crosslinker in the core polymer are well known to those skilled in the art, and are generally monomers copolymerizable with the other core monomers and having polyethylenic unsaturation in which the ethylenically unsaturated groups have approximately equal reactivity, as for example divinylbenzene, glycol di- and trimethacrylates and acrylates, triol triacrylates and methacrylates and the like. The preferred crosslinking monomers are butylene glycol diacrylates. If crosslinking monomer is employed, it is preferably used at levels of from about 0.05 to about 10%, more preferably 0.05 to about 5%, and still more preferably from about 0.1 to about 1%, based on the total core monomer weight. Graftlinking monomers suitable for use as the graftlinker in the core polymer are also well known, and generally are polyethylenically unsaturated monomers copolymerizable with the other core monomers and having sufficiently low reactivity of the unsaturated groups to allow significant residual unsaturation to remain in the core polymer subsequent to its polymerization, as for example allyl methacrylate, diallyl maleate, allyl acryloxypropionate and the like. The preferred graftlinking monomer is allyl methacrylate. If a graftlinking monomer is employed, it is preferably used at levels from about 0.1 to about 10% more preferably about 0.1 to about 5%, more preferably from about 0.5 to about 5%, and still more preferably from about 0.5 to about 2.5%, based on the total weight of the core monomers.

Alternatively, the core polymer may be crosslinked and the core polymer may be graftlinked to the shell polymer using other techniques known to those skilled in the art, as for example by post-cure reactions. Such a post-cure reaction may be seen when a copolymer is formed from a monomer having a pendant peroxide group, which is then activated by heating to a temperature higher than that used in the polymerization. The activated peroxide group will promote graftlinking and crosslinking of the core/shell polymer components. In another example, a second free-radical initiator may be added to the polymerization; this second initiator is selected to be stable at the initial polymerization temperature, but to be activated by light or a higher temperature subsequent to the initial polymerization.

The core polymer may contain residual oligomeric material used in the polymerization process to swell the polymer particles but such oligomeric material has a high enough molecular weight to prevent its diffusion or being extracted during processing or use, and is present at such a low concentration that it has little or no effect upon mechanical properties of the core, the core/shell polymer, or the light-scattering composition.

Surrounding the core of the particles are one or more shells of polymer, the outer shell being a polymer compatible with the matrix polymer, i.e., the polymer itself is capable of forming a homogeneous blend with the matrix polymer. For example, a shell of poly(methyl methacrylate) will be compatible with a matrix polymer of poly(methyl methacrylate), or poly(vinyl chloride). The shell polymer may be compatible with the matrix polymer as a result of chemical similarity, as in the above example of methyl methacrylate polymers for the shell and the matrix polymer, or it may be determined empirically to be compatible, as in a shell of styrene copolymerized with about 25 to about 30%, based on total shell monomer weight, of acrylonitrile; this shell is also compatible with a poly(methyl methacrylate) or a poly(N-methyl glutarimide) matrix polymer. Many such compatible polymer combinations for the shell and matrix polymers are known to those skilled in the art, and others may readily be determined by routine experimentation, as for example by preparing blends of proposed shell polymers and the matrix polymer and examining the blends for such evidence of compatibility as absence of haze, existence of a single glass transition temperature, and the like.

The shell polymers comprise from about 0.1 to about 40%, preferably from about 5 to about 40%, and more preferably from about 15 to about 35%, of the total particle weight.

The core/shell polymer particles useful in the present invention have a particle diameter from about 2 and about 15 μm, preferably from about 5 to about 10 μm, and a narrow particle size distribution within any particular polymer composition, preferably such that 90% by weight of the particles fall within ±20% of the average particle diameter. If many particles much larger than the desired size are present in the light-scattering composition, the efficiency of diffusion is decreased and the polymer surface is less attractive, while if many undersized particles are present, backscattering increases and overall light transmission decreases. Such a narrow size distribution is readily obtained by emulsion polymerization techniques, but the particles themselves tend to be smaller than 1 μm. Particles at the upper end of the desired size range may be made by suspension polymerization techniques but the size distribution is unacceptably broad. Consequently, although other techniques for preparing particles having the particle size, size distribution and core-shell configuration are useful in the present invention, the preferred technique for making them involves preparing uniformly sized small particles by emulsion polymerizing at least one monomer component of the core polymer to form emulsion polymer particles, swelling the emulsion polymer particles with one or more monomer components of the core polymer, and polymerizing the monomer within the emulsion polymer particles. The swelling and polymerizing steps may be repeated until the particles have grown to the desired core size. A preferred procedure for making the core involves emulsion polymerizing the initial emulsion polymer particles using conditions which restrict the molecular weight of the polymer that forms, such as by including chain-transfer moderators, e.g., mercaptans, in the polymerization mixture, such that the resulting emulsion particles comprise an easily swellable oligomer. This process may be varied by preparing the initial emulsion polymer particles in the absence of such limiting of the polymer molecular weight, but subsequently conducting one or more of the swelling and polymerizing steps using the conditions which restrict the polymer molecular weight. In this variation the initial emulsion polymer particles do not swell as readily as subsequent, larger particles having a lower overall molecular weight. As in the preferred process above, at least the final polymerization is carried out under conditions which do not so limit the polymer molecular weight.

The process of preparing the particles of the present invention may include

A) selecting as a rubbery core polymer composition a copolymer of an alkyl acrylate, the alkyl group having from 2 to 8 carbon atoms and the copolymer having a refractive index within ±0.05 units of, but no closer than about ±0.003 units to, the refractive index of the matrix polymer, B) polymerizing particles of core polymer, from a first aqueous emulsion of one or more of the monomers which, when polymerized, produce the selected core polymer, C) performing one or more steps of
  1) swelling the particles of core polymer with one or more of the monomers, which, when polymerized, produce the selected core polymer, and
  2) polymerizing the swelling monomer within the particles of core polymer, until all of the monomers which lead to the selected core polymer have been polymerized in these particles, and the particles have reached a desired size within the range from about 2 to about 15 μm, and D) performing one or more steps of
  1) suspending the core polymer particles in a second aqueous monomer emulsion, the monomers of which are polymerizable to form a polymer compatible with the matrix polymer, and
  2) polymerizing onto the polymer particles a polymer shell from the monomer in the second emulsion.

The shell or shells are polymerized onto the previously polymerized layers using conventional core/shell techniques such as those taught by Owens, U.S. Pat. No. 3,793,902, which is hereby incorporated into the present specification by reference.

The above process for growing larger particles from emulsion-sized particles retains much of the size uniformity of the original, emulsion particles, and is capable of increasing the size of the original, methacrylate known as polyglutarimides, and copolymers of methyl methacrylate with alkyl acrylates, styrene with up to 40% acrylonitrile, styrene with methyl methacrylate, alpha-methylstyrene with methyl methacrylate and alkyl acrylates, vinyl chloride with vinyl acetate or propylene, the alkyl group of the alkyl acrylates containing 1 to 8 carbon atoms. Also suitable are homopolymers and copolymers of cellulose acetate butyrate and certain amorphous condensation polymers such as poly(ethylene terephthalate) and poly(cyclohexanedimethanol terephthalate). Preferred matrix polymers are copolymers of methyl methacrylate with from about 1 to about 15% alkyl acrylates wherein the alkyl contains from 1 to 8 carbon atoms.

Softer matrix polymers, including polymers capable of plasticization, may also be used, such as poly(vinyl acetate), plasticized vinyl chloride homo- and copolymers, plasticized cellulosic esters and the like.

Another preferred class of matrix polymers useful in the present invention are thermoset polymers. The polymers may be thermoset as prepared, such as in casting of a sheet of poly(methyl methacrylate) containing sufficient polyfunctional monomer to immobilize and insolubilize the resulting sheet, or the polymer may be thermoset after polymerization is completed, such as by activating a cure reaction by heating of the polymerized sheet. Examples of such thermosettable matrix polymers include homopolymers of methyl methacrylate, styrene, vinyl chloride and the like, imidized polymers of methyl methacrylate known as polyglutarimides, and copolymers of methyl methacrylate with alkyl acrylates, styrene with up to 40% acrylonitrile, styrene with methyl methacrylate, alpha-methylstyrene with methyl methacrylate and alkyl acrylates and vinyl chloride with vinyl acetate or propylene. Compatible or refractive-index matched blends of the matrix polymers may be used. Preferred matrix polymers are copolymers of methyl methacrylate with from about 1 to about 15% alkyl acrylates wherein the alkyl contains from 1 to 8 carbon atoms and which also contain a polyfunctional dimethacrylate monomer at the 0.05 to 2% level, or which contain acrylamide and N-methylolacrylamide at the 0.05 to about 5% level.

The thermoset polymers need not be formed from vinyl monomers, but may be prepared by condensation or ring-opening polymerization, such as by polyesterification in the presence of multifunctional glycols or by epoxide polymerization in the presence of trifunctional epoxides.

The single-phase polymer and core/shell polymer are incorporated into the matrix polymers preferably by melt blending, although other techniques known to those skilled in the art may be employed. For instance, they may be introduced dry into the monomers of the matrix polymer prior to their polymerization. Other conventional additives, such as ultraviolet-light stabilizers, soluble flame retardants, dyes, thermal stabilizers, and the like may also be present in the blend of core/shell or single-phase polymer with matrix polymer.

The level of single-phase polymer and core/shell polymer present in the matrix polymer will depend upon the optical effect desired, the thickness of the final fabricated article, the core/shell particle size and the difference in refractive index between the particle (or core if core/shell) and the matrix polymer. A practical useful range for the single-phase polymer and/or core/shell polymer is from about 0.1 to about 40%, preferably to about 30%, more preferably to about 20% and even more preferably to about 10% of the total polymer weight.

Conventional impact-strength modifiers may also be incorporated into the blend of spherical polymer particles and matrix polymer of the present invention. Such impact-strength modifiers must be chosen to give a clear, non-light-scattering blend with the matrix polymer alone. Examples of such modifiers for poly(methyl methacrylate) are given by Owens, U.S. Pat. No. 3,793,402, and for poly(vinyl chloride) by Myers et al., U.S. Pat. No. 3,971,835 and Amagi et al., U.S. Pat. No. 3,671,610. It should be noted that the spherical polymer particles, which contain rubbery acrylate polymers, used in the present invention do not significantly degrade, and may in some cases actually improve, the impact strength of the light-scattering composition, unlike inorganic particles and hard, crosslinked polymer particles that have been used as light-scattering agents in the prior art.

In yet another aspect of the present invention, we provide a thermoplastic or thermoset polymer composition having a reduced-gloss or matte surface finish.

In accordance with this aspect of the present invention, we provide a thermoplastic or thermoset polymer composition having reduced-gloss or matte surface finish which comprises a thermoplastic or thermoset matrix polymer and, distributed throughout the matrix polymer, from about 0.1 to about 40%, preferably from about 0.1 to about 10% of the total composition weight of substantially spherical polymer particles having an average diameter of from 2 to 15 µm, preferably 2 to 10 µm, more preferably 4 to 10 µm, still more preferably 5 to 10 µm, and a particle size distribution such that at least 90% of the particles fall with ±20% of the average particle diameter.

The matrix polymers useful in the present invention are preferably thermoplastic polymers that do not crystallize under processing or use conditions, i.e., that have a glass-transition temperature higher than about 50° C., and thus are amorphous following incorporation of the particulate polymer composition of the present invention, and that remain amorphous following processing to form the low-gloss composition of the present invention or low-gloss articles made from the sheet. These matrix polymers typically have an elastic modulus of about 1400 to about 3500 MegaPascals (MPa), and may be formed into shaped articles by molding, casting, extrusion or other processes apparent to those skilled in the art. Examples of such matrix polymers include homopolymers of methyl methacrylate, styrene, vinyl chloride and the like, imidized polymers of methyl methacrylate known as polyglutarimides, and copolymers of methyl methacrylate with alkyl acrylates, styrene with up to 40% acrylonitrile, styrene with methyl methacrylate, alpha-methylstyrene with methyl methacrylate and alkyl acrylates, vinyl chloride with vinyl acetate or propylene, and the like. Also suitable are cellulose acetate butyrate and certain amorphous condensation polymers such as poly(ethylene terephthalate), poly(cyclohexanedimethanol terephthalate) and the like. Preferred matrix polymers are copolymers of methyl methacrylate with from about 1 to about 15% alkyl acrylates wherein the alkyl contains from 1 to 8 carbon atoms; also preferred is poly(vinyl chloride).

Softer matrix polymers, including polymers capable of plasticization, may also be used, such as poly(vinyl acetate), plasticized vinyl chloride homo- and copolymers, plasticized cellulosic esters and the like.

If transparency is not an inherent property of the matrix polymer, then a wider variety of matrix polymers may be used, such as acrylonitrile-butadiene-styrene (ABS), polyolefins, such as polyethylene or polypropylene, engineering resins, such as polycarbonates, polycarbonate-polyester blends, polyamides, poly(alkylene terephthalates) and blends thereof.

The spherical polymer particles are incorporated into the matrix polymers preferably by melt blending although other techniques known to those skilled in the art may be employed. For instance, they may be introduced dry into the monomers of the matrix polymer prior to their polymerization. Other conventional additives, such as ultraviolet-light stabilizers, soluble flame retardants, dyes, thermal stabilizers, plasticizers, and the like may also be present in the blend of spherical polymer particles and matrix polymer The level of particulate polymer present in the matrix polymer will depend upon the optical effect desired, the thickness of the final fabricated article, the particle size and the difference in refractive index between the particle and the matrix polymer. A practical useful range for the spherical polymer particles is preferably from about 0.1 to about 10% of the total polymer weight, although useful effects may be achieved at levels above, e.g. up to about 40% of the total polymer weight, and below this range.

Polymer blends of additive and matrix may be blended and extruded into pellets, which then are molded or extruded into acceptable objects. The blends may be optionally processed directly into sheet or film. Typical matrix polymers which may be used include polymers of methyl methacrylate, of styrene, of styrene copolymers with, e.g., acrylonitrile or methacrylates or maleic anhydride. The additives are useful in preparing low-gloss film and sheet from poly(vinyl chloride) homopolymers, as well as from copolymers of vinyl chloride with vinyl acetate or propylene. Impact modified versions of the above, such as the toughened acrylic polymers taught by Owens, acrylic film such as taught in U.S. Pat. No. 3,562,235, poly(vinyl chloride) modified with methacrylate/butadiene/styrene or acrylate/methacrylate staged polymers, ABS plastics, or high-impact polystyrene may be used in conjunction with said flatting agents. Certain polyolefins, such as polyethylene, will also respond to such flatting agents.

Engineering thermoplastics, such as polycarbonates, polyamides, poly(alkylene terephthalates), and the like, (including blends of two or more such engineering thermoplastics or blends of such a thermoplastic with an impact modifier) may also be blended with such additive polymers.

Another class of matrix polymers useful in the present invention are thermoset polymers. The polymers may be thermoset as prepared, such as in casting of a sheet of poly(methyl methacrylate) containing sufficient polyfunctional monomer to immobilize and insolubilize the resulting sheet, or the polymer may be thermoset after polymerization is completed, such as by activating a cure reaction by heating of the polymerized sheet. Examples of such thermosettable matrix polymers include homopolymers of methyl methacrylate, styrene, vinyl chloride and the like, imidized polymers of methyl methacrylate known as polyglutarimides, and copolymers of methyl methacrylate with alkyl acrylates, styrene with up to 40% acrylonitrile, styrene with methyl methacrylate, alphamethylstyrene with methyl methacrylate and alkyl acrylates, vinyl chloride with vinyl acetate or propylene and the like. Preferred matrix polymers are copolymers of methyl methacrylate with from about 1 to about 15% alkyl acrylates wherein the alkyl contains from 1 to 8 carbon atoms and which also contain a polyfunctional dimethacrylate monomer at the 0.05 to 2% level, or which contain acrylamide and N-methylolacrylamide at the 0.05 to about 5% level.

The thermoset polymers need not be formed from vinyl monomers, but may be prepared by condensation or ring-opening polymerization, such as by polyesterification in the presence of multifunctional glycols or by epoxide polymerization in the presence of trifunctional epoxides.

The spherical polymer particles comprises individual particles with a diameter from about 2 to about 15 $\mu$m, preferably about 2 to about 10 $\mu$m, more preferably from about 5 to about 10 $\mu$m, and having a narrow particle-size distribution. The particle size distribution is such that at least 90% by weight of the particles fall within ±20% of the average diameter of the particles; it is understood that the term "particle size distribution" used herein refers to the size range of at least 90% by weight of the particles. The particles may be prepared from one or more vinyl monomers, and may be a rubbery or glassy polymer. The spherical polymer particles may be prepared from polymerization or copolymerization of such monomers as diolefins, such as butadiene or isoprene, vinyl aromatic monomers, such as styrene or chlorostyrene vinyl esters, such as vinyl acetate or vinyl benzoate, acrylonitrile, methacrylonitrile, (meth)acrylate esters, such as methyl methacrylate, butyl methacrylate, phenyl methacrylate, ethyl acrylate, butyl acrylate, 2-ethylhexyl acrylate, benzyl acrylate, vinyl chloride, and other common monomers polymerizable by free-radical initiation. Copolymers encompass polymers made by staged or power feeds of monomers, so that the spherical polymer particles may not necessarily be uniform in composition.

We have found that matte or flatted surface with low gloss can be obtained for opaque or filled thermoplastic or thermoset matrix polymers by incorporating in them the spherical polymer particles of the present invention. In both cases, we believe the narrow particle size distribution of the particles of the present invention leads to a surprisingly higher efficiency of use, so that less additive polymer is necessary to effect the gloss reduction.

We have also found that if the refractive index of the spherical polymer particles is carefully matched to the refractive index of the thermoplastic or thermoset matrix polymer a light-scattering or substantially clear polymer composition can be formed having excellent flatting performance while maintaining good contact clarity; little diminution is seen in impact resistance, flow or other physical or rheological properties of the matrix polymer versus an unmodified control. Preferably, if the final thermoplastic or thermoset polymer composition is to be light-scattering, then the spherical polymer particles will comprise at least one polymeric phase which has a refractive index ($n_D^{25}$) within ±0.2 units of, but preferably no closer than about ±0.003 units to, the refractive index of the matrix polymer. If the thermoplastic or thermoset polymer composition is to be substantially clear or transparent, then the spherical polymer particles will comprise at least one polymeric phase which has a refractive index within ±0.003 units of the refractive index of the matrix polymer.

The spherical polymer particles may comprise only a single polymeric phase, i.e. a single-phase polymer, or they may comprise a polymeric core phase and one or more polymeric shell phase(s) i.e. a core/shell polymer. If the thermoplastic or thermoset polymer composition is to be substantially clear or light-scattering, the single-phase polymer or the core of the core/shell polymer preferably has the refractive index values described above.

One way of preparing the spherical polymer particles is described in Ugelstad, U.S. Pat. No. 4,186,120.

When the spherical polymer particles of this invention are prepared by polymerizing a crosslinked core polymer and encapsulating it with a hard, noncrosslinked shell compatible with the matrix polymer, the polymer compositions having reduced surface gloss are most effective when they are extruded into a film or sheet without contact with a metal surface while hot.

Further techniques for preparation of relatively uniform particle size materials by modified emulsion or suspension techniques have appeared in the literature. They do not teach the utility of such polymers as flatting agents, and they have generally been useful for producing non-polar polymers, such as polystyrene, while teaching away from obtaining similar polymers from monomer mixtures rich in acrylate or methacrylate monomer. Japanese Kokai 62-84156 is noted in this respect.

Surrounding the core of the particles may be one or more shells of polymer, the outer shell being a polymer compatible with the matrix polymer, i.e., the polymer itself is capable of forming a homogeneous blend with the matrix polymer. For example, a shell of poly(methyl methacrylate) will be compatible with a matrix polymer of poly(methyl methacrylate), or poly(vinyl chloride). The shell polymer may be compatible with the matrix polymer as a result of chemical similarity, as in the above example of methyl methacrylate polymers for the shell and the matrix polymer, or it may be determined empirically to be compatible, as in a shell of styrene copolymerized with about 30%, based on total shell monomer weight, of acrylonitrile; this shell is also compatible with a poly(methyl methacrylate) matrix polymer. Many such compatible polymer combinations for the shell and matrix polymers are known to those skilled in the art, and others may readily be determined by routine experimentation, as for example by preparing blends of proposed shell polymers and the matrix polymer and examining the blends for such evidence of compatibility as absence of haze, existence of a single glass transition temperature, and the like.

If a shell is present, shell polymers comprise from about 5 to about 40%, preferably from about 15 to about 35%, of the total particle weight. Methods described herein for the formation of such shells are particularly applicable.

The preferred particles for modifications of poly(vinyl chloride) or poly(methyl methacrylate) matrices are spherical polymer particles of rubbery alkyl acrylate polymer, the alkyl group having from 2 to 8 carbon atoms, copolymerized with 0 to about 10% crosslinking monomers, preferably 0 to about 5% crosslinking monomer, and 0 to about 50% other copolymerizable vinyl monomer. The preferred alkyl acrylate is butyl acrylate, and the preferred other copolymerizable vinyl monomer or monomers are more preferably monovinyl monomers, preferably selected from the group consisting of alkyl methacrylates and monovinyl arenes, and still more preferably styrene. Monovinyl arenes, as used herein, include such monoethylenically unsaturated aromatic monomers as styrene, alkylstyrenes such as methylstyrene and ethylstyrene, other substituted vinylbenzenes wherein the substitutents do not interfere with polymerization, and similar vinyl polycyclic aromatic monomers. The indicated percentages are by weight (as are all proportions used herein unless otherwise indicated), and are percentages of the total spherical polymer particles monomer. If a substantially clear polymer composition is required, the alkyl acrylate and any copolymerizable vinyl monomer are selected such that the refractive index of the spherical polymer particle will be within ±0.003 units of the refractive index of the matrix polymer.

Another particulate polymer composition useful for the modification of acrylic or poly(vinyl chloride) matrix polymers without diminution of physical properties comprises particles of polymer having a diameter of from about 2 to about 10 $\mu$m, and a size distribution such that at least 90% by weight of the particles have a diameter within about ±20% of the average particle diameter, the particles further having a core of rubbery alkyl acrylate polymer, the alkyl group having from 2 to 8 carbon atoms, the core containing 0 or up to about 10% crosslinker (based on the total weight of the core), and having a refractive index ($n_D^{25}$) preferably within about ±0.003 units of the refractive index of the matrix polymer, and an outer shell of polymer compatible with the matrix polymer, which shell comprises from about 5 to about 40% of the weight of the particles.

Crosslinking monomers suitable for use as the crosslinker in the spherical polymer particles are well known to those skilled in the art, and are generally monomers copolymerizable with the monounsaturated monomers present, and having polyethylenic unsaturation in which the ethylenically unsaturated groups have approximately equal reactivity, as for example divinylbenzene, glycol di- and trimethacrylates and acrylates, triol triacrylates and methacrylates and the like. The preferred crosslinking monomers are butylene glycol diacrylates. A second class of crosslinking monomers, often referred to as graftlinking monomers, are polyethylencially unsaturated monomers copolymerizable with the monounsaturated monomers present, and having two or more non-conjugated double bonds of differing reactivity, as for example allyl methacrylate, diallyl maleate, allyl acryloxypropionate and the like. The preferred crosslinking monomer from this group is allyl methacrylate. Combinations of both types of crosslinking monomers may be employed. If crosslinking monomer is employed, it is preferably used at levels of from about 0.05 to about 10%, more preferably from about 0.1 to about 5%, and most preferably from about 0.1 to about 1%, based on the total monomer weight.

Alternatively, the spherical polymer particle may be crosslinked using other techniques known to those skilled in the art, as for example by post-cure reactions. Such a post-cure reaction may be seen when a copolymer is formed from a monomer having a pendant peroxide group, which is then activated by heating to a temperature higher than that used in the polymerization. The activated peroxide group will promote crosslinking of the spherical polymer particle. In another example, a second free-radical initiator may be added to the polymerization; this second initiator is selected to be stable at the initial polymerization temperature, but to be activated by light or a higher temperature subsequent to the initial polymerization.

The spherical polymer particle may contain residual oligomeric material used in the polymerization process to swell the polymer particles but such oligomeric material has a high enough molecular weight to prevent its diffusion or being extracted during processing or use, and is present at such a low concentration that it has little or no effect upon mechanical properties of the spherical polymer particles or the light-scattering composition.

As noted, the preferred core/shell polymer particles useful in the present invention have a particle diameter from about 2 to about 10 $\mu$m, preferably from about 2 to about 8 $\mu$m, and a narrow particle size distribution within any particular polymer composition, preferably such that 90% by weight of the particles fall within ±20% of the average particle diameter. If many particles much larger than the desired size are present in the light-scattering composition, the efficiency of diffusion is decreased and the polymer surface is less attractive, while if many undersized particles are present, backscattering increases and overall light transmission decreases. Such a narrow size distribution is readily obtained by emulsion polymerization techniques, but the particles themselves tend to be smaller than 1 $\mu$m. Particles at the upper end of the desired size range may be made by suspension polymerization techniques but the size distribution is unacceptably broad. Consequently, although other techniques for preparing particles having the particle size, size distribution and spherical configuration are useful in the present invention, the preferred technique for making them involves preparing uniformly sized small particles by emulsion polymerizing at least one monomer component of the spherical polymer particle to form emulsion polymer particles, swelling the emulsion polymer particles with one or more monomer components of the spherical polymer particle, and polymerizing the monomer within the emulsion polymer particles. The swelling and polymerizing steps may be repeated until the particles have grown to the desired size. A preferred procedure for making the spherical polymer particles involves emulsion polymerizing the initial emulsion polymer particles using conditions which restrict the molecular weight of the polymer that forms, such as by including chain-transfer moderators, e.g., mercaptans, in the polymerization mixture, such that the resulting emulsion particles comprise an easily swellable oligomer. This process may be varied by preparing the initial emulsion polymer particles in the absence of such limiting of the polymer molecular weight, but subsequently conducting one or more of the swelling and polymerizing steps using the conditions which restrict the polymer molecular weight. In this variation the initial emulsion polymer particles do not swell as readily as subsequent, larger particles having a lower overall molecular weight. As in the preferred process above, at least the final polymerization is carried out under conditions which do not so limit the polymer molecular weight.

When a core/shell polymer is used, the shell or shells are polymerized onto the previously polymerized layers using conventional core/shell techniques such as those taught by Owens, U.S. Pat. No. 3,793,902, which is hereby incorporated into the present specification by reference.

The above process for growing larger particles from emulsion-sized particles retains much of the size uniformity of the original, emulsion particles, and is capable of increasing the size of the original, emulsion-polymerized polymer by a factor of at least 10 and as much as 1000. A small amount of very small emulsion particles may be observed in the product of these processes, but such particles account for much less than 1.0% of the total particle weight, and do not adversely affect the optical properties of the light-scattering polymer.

The finished particles, whether encapsulated by a shell or not, may be isolated from their aqueous media by allowing them to settle and decanting the aqueous medium, or by filtering. They may also be used by adding them in aqueous dispersion to the matrix polymer in the melt and allowing the water to evaporate rapidly. Alternatively, coagulation aids, such as salts or acids may be added to eliminate adventitious white water. Spray drying may also be employed. A small amount of copolymerizable unsaturated acid, such as methacrylic acid or acrylic acid, may be incorporated into the monomers used for the final step of the shell polymerization, or the final step of particle polymerization if no shell is added, to improve the dispersion stability of the particles when dispersed in the aqueous media. If the isolation process involves a later devolatilization step, the aqueous dispersion may be admixed directly with the matrix polymer, and the water removed as vapor or as liquid. Such equipment as a Welding Engineers twin-screw devolatilizing extruder may be used, as taught by Bortnick in U.S. Pat. No. 3,751,527. The particulate polymer aqueous preparation may also be admixed with an impact modifier and/or polymeric processing aid in emulsion form and the products co-isolated by spray drying, coagulation, or a devolatilization-extrusion process.

Convention impact-strength modifiers may also be incorporated into the blend of single-phase or core/shell polymer particles and matrix polymer. To obtain a clear impact-modified blend with a matte surface, such modifiers must be chosen to give a clear, non-light-scattering blend with the matrix polymer alone. Examples of such modifiers for poly(methyl methacrylate) are given by Owens, U.S. Pat. No. 3,793,402, and for poly(vinyl chloride) by Myers et al., U.S. Pat. No. 2,971,835 and Amagi et al., U.S. Pat. No. 3,671,610. It should be noted that the acrylic-based single phase or core/shell polymer particles of the present invention do not significantly degrade, and may in some cases actually improve, the impact strength of the particle polymer-matrix polymer blend, unlike inorganic particles and hard, crosslinked polymer particles that have been used as light-scattering agents in the prior art.

Such a surface-altered or matte-finished or low-gloss composition is especially useful for surfaces of molded or shaped objects where low reflectance is desired, such as machine, TV set, computer, and office equipment housings. Such are also useful in clear film and sheet to achieve high contact clarity while reducing glare; such uses include protective glazing for photographs and paintings, film, such as poly(vinyl chloride) (PVC) film, wraps for small objects such as batteries, overlays for printed material, and the like. Such surface altered polymers may also be used in films requiring a slightly roughened surface for improved adhesion, such as polyolefin films, or they may be used to reduce adhesion between surfaces and so prevent blocking.

For uses where clarity is desired, we have found that narrow-size-distribution particulate polymers within a relatively narrow particle size range of about 2 to about 10 μm and carefully refractive-index matched with the substrate exhibit excellent flatting performance while maintaining good contact clarity. For uses where clarity is not essential, it is not necessary to supply the refractive index match, although such may be desired for best pigmentation effects. The particulate polymers may be further modified with a shell polymer having compatibility with the matrix polymer, the shell being about 5 to about 40% of the final isolated polymeric additive. Preferably about 0.1 to about 10% of the particulate polymer additive is effective in achieving surface alteration of the matrix polymer.

Uses of such molded or extruded objects having matte finish or low surface gloss are many. Housings for electronic equipment, such as TV cabinets or housings for computers may be prepared with a low gloss using the additives of the invention. Low-gloss film of good contact clarity may be prepared for covering of pictures or photographs to avoid glare from reflected light. Calendered sheet and sign stock may be prepared. Pigments, fillers, impact modifiers, stabilizers, etc. may be added to the formulation to achieve appropriate manufactured articles. Building products, such as siding, roofing, windows and extruded profile made from poly(vinyl chloride) or other plastics may exhibit a desirable lowered gloss without diminution of other properties when manufactured with the additives of the present invention.

The following examples are intended to illustrate the invention and not to limit it except as it is limited in the claims. All percentages and ratios are by weight unless otherwise indicated, and all reagents are of good commercial quality unless otherwise indicated.

EXAMPLES

EXAMPLE 1

This example illustrates preparation of 0.3 μm-diameter particles of butyl acrylate-styrene copolymer by emulsion polymerization. The following aqueous mixtures were prepared:

| Mixture | Component | Parts by Weight |
| --- | --- | --- |
| A | Water | 162 |
|   | Potassium Carbonate | 0.12 |
| B | Butyl Acrylate | 66 |
|   | Styrene | 15 |
|   | n-octyl mercaptan | 19 |
|   | 10% aqueous sodium | 5.3 |

| Mixture | Component | Parts by Weight |
|---|---|---|
|  | dodecylbenzenesulfonate |  |
|  | Water | 19 |
| C | Potassium Persulfate | 0.014 |
|  | Water | 1.4 |
| D | Potassium Persulfate | 0.055 |
|  | Water | 8.3 |

A reactor equipped with a stirrer and condenser and blanketed with nitrogen was charged with Mixture A and heated to 87° C. To the stirred reactor contents were added 7% of Mixture B and all of Mixture C; the reactor contents were stirred for 30 minutes, after which the remaining Mixture B and Mixture D were added, with stirring, over a period of 90 minutes. The reactor contents were maintained at 87° C. with stirring for 50 minutes, after which the resulting emulsion was cooled to room temperature. The butyl acrylate-styrene particles were 0.3 μm in diameter, as measured by Nanosizer.

EXAMPLE 2

This example illustrates growing 2 μm-diameter particles of uniform size from the 0.3 μm-diameter particles of Example 1, using an emulsion of butyl acrylate with butylene glycol diacrylate crosslinking monomer and allyl methacrylate graftlinking monomer. The following aqueous mixtures were prepared:

| Mixture | Component | Parts by Weight |
|---|---|---|
| A | Butyl Acrylate | 98 |
|  | Butylene Glycol Diacrylate | 0.50 |
|  | Allyl Methacrylate | 2.0 |
|  | Benzoyl Peroxide | 0.80 |
| B | Magnesium p-Nitrosophenolate | 0.011 |
|  | Water | 226 |
|  | 10% aqueous Sodium Dodecylbenzenesulfonate | 3.1 |
| C | The polymer emulsion of Ex. 1 | 1.5 |

Mixture A was blended with Mixture B in a Waring Blender for 3 minutes to form an emulsion. This emulsion was charged to a pressure reactor with Mixture C, and the reactor contents were stirred under a nitrogen blanket for 1 hour. The reactor was sealed, shaken in a water bath at 68° C. for 3 hours, and cooled to room temperature. The polymer particles from the reaction mixture, when examined by optical microscopy, were uniformly sized and about 2 μm in diameter.

EXAMPLE 3

This example illustrates growing 5 μm-diameter particles from the 2 μm particles of Example 2. The procedure of Example 2 was repeated, except that Mixture C was 23 parts by weight of the particle dispersion produced in Example 2. The resulting particles had a diameter of approximately 5 μm.

EXAMPLE 4

This example illustrates polymerizing an outer shell of methyl methacrylate and ethyl acrylate onto the particles of Examples 3, to finish the core/shell polymer particles of the present invention. The following aqueous mixtures were prepared:

| Mixture | Component | Parts by Weight |
|---|---|---|
| A | Particle dispersion from Ex. 3 | 1348 |
| B | Methyl Methacrylate | 96 |
|  | Ethyl Acrylate | 4.0 |
| C | 3% aqueous Sodium Formaldehyde Sulfoxylate | 10 |
|  | 10% aqueous Sodium Dodecylbenzenesulfonate | 1.5 |
|  | Water | 53 |
| D | t-Butyl Hydroperoxide | 0.45 |
|  | Water | 14 |

Mixture A was weighed into a reactor equipped with a stirrer and condenser and blanketed with nitrogen. The reactor contents were heated to 65° C. and stirred under the nitrogen blanket; Mixture B, C and D were separately added to the reactor over a period of 90 minutes. The temperature was maintained at 65° C., and stirring was continued, for 30 minutes, after which the reactor contents were cooled to room temperature. The resulting particles were about 5 μm in diameter, with less than about 20% of the number of particles between 2 and 4 μm and a very small number of particles were below 0.5 μm.

EXAMPLE 5

This example illustrates preparation of a different emulsion polymer for use in preparing the core/shell particles of the present invention. The following mixtures were prepared:

| Mixture | Component | Parts By Weight |
|---|---|---|
| A | Water | 208 |
|  | Sodium Carbonate | 0.38 |
| B | Butyl Acrylate | 98 |
|  | Butylene Glycol Diacrylate | 0.25 |
|  | Allyl Methacrylate | 2.0 |
|  | 10% aqueous Sodium Dodecylbenzenesulfonate | 4.0 |
|  | Water | 40 |
| C | Potassium Persulfate | 0.063 |
|  | Water | 35 |

A reactor equipped with stirrer and condenser and blanketed with nitrogen was charged with Mixture A and heated to 82° C. To the reactor contents was added 15% of Mixture B and 25% of Mixture C. The temperature was maintained at 82° C. and the mixture was stirred for 1 hour, after which the remaining Mixture B and Mixture C were added to the reactor, with stirring over a period of 90 minutes. Stirring was continued at 82° C. for 2 hours, after which the reator contents were cooled to room temperature. The particle size of the resulting emulsion particles was 0.2 μm, as measured by Nanosizer.

EXAMPLE 6

In this example the particles in the emulsion of Example 5 are grown to 0.5 μm diameter using an emulsion of butyl acrylate and styrene. The following mixtures were prepared:

| Mixture | Component | Parts by Weight |
|---|---|---|
| A | Water | 185 |
|  | Sodium Carbonate | 0.081 |
|  | Polymer Emulsion from Example 5 | 35 |
| B | Butyl Acrylate | 82 |

-continued

| Mixture | Component | Parts by Weight |
|---------|-----------|-----------------|
|  | Styrene | 18 |
|  | 10% aqueous Sodium Dodecylbenzenesulfonate | 2.5 |
|  | Water | 32 |
| C | 1-Hexanethiol | 19 |
|  | 10% aqueous Sodium Dodecylbenzenesulfonate | 2.8 |
|  | Water | 11 |
| D | Potassium Persulfate | 0.11 |
|  | Water | 18 |
| E | t-Butyl Hydroperoxide | 0.18 |
|  | Water | 3.7 |
| F | 3% aqueous Sodium Formaldehyde Sulfoxylate | 4.1 |

Mixture A was added to the reactor of Example 5 and heated to 88° C. with stirring. Mixtures B, C and D were added, with stirring, to the reactor over a period of 3 hours, after which the temperature was maintained at 88° C., with stirring, for 90 minutes. The reactor contents were cooled to 65° C., Mixtures E and F were added, and the reactor contents were maintained at 65° C., with stirring, for 1 hour, after which the reactor contents were cooled to room temperature. The resulting emulsion polymer particles had a diameter of 0.5 μm as measured by Nanosizer.

EXAMPLE 7

This example illustrates growing 5 μm diameter particles from the 0.5 μm particles of Example 6 using an emulsion of butyl acrylate containing butylene glycol diacrylate crosslinker and allyl methacrylate graft-linker. In this example the procedure of Example 2 was repeated, except that 0.34 parts of the 0.5 μm diameter particle emulsion from Example 6 was used as Mixture C. The resulting polymer particles had a narrow particle size distribution and an average particle diameter of about 5 μm, as determined by optical microscopy.

EXAMPLE 8

This example illustrates polymerization of the outer shell onto the particles prepared in Example 7, to complete preparation of the second core/shell polymer particles of the present invention. The procedure of Example 4 was repeated, using the 5 μm particle dispersion prepared in Example 7 as Mixture A. The resulting particles had a narrow particle size distribution and a particle size diameter of about 5 μm, as determined by optical microscopy.

EXAMPLE 9

This example illustrates preparation of a light-scattering polymer composition using the core/shell polymer particles of the present invention prepared in Example 8. The core/shell particles were isolated from the aqueous dispersion by coagulation with aqueous calcium hypophosphite coagulant, and 2 parts by weight of the particles were melt-blended with 98 parts by weight of poly(methyl methacrylate) having a weight-average molecular weight of about 120,000, at 232° C. The blended polymer was compression molded at 204° C. into 12.7-cm-square plaques, and were evaluated for optical properties at room temperature. A goniophotometer was used to determine the intensity of light transmitted through the sample plaque at different angles; the sum of light transmitted at all angles is expressed as total luminous transmittance. The haze was determined using a HunterLab colorimeter. Hiding power is calculated by the following:

$$\text{Hiding Power} = \frac{I[2]}{I[0]}$$

where I[0] is the transmitted light intensity at an angle of 0°, and I[2] is the transmitted light intensity at an angle of 2°.

EXAMPLES 10–32

These examples illustrate the effect upon the optical properties of poly(methyl methacrylate) when it is blended with various concentrations of core/shell polymer particles of the present invention having different refractive indices and particle sizes. The desired refractive index of the inner stage (or core) polymer was achieved by copolymerizing butyl acrylate with appropriate amounts of styrene. Polymer particles larger than 5 μm were prepared by using the procedures of Example 3 except that Mixture C was an appropriate amount of 5 μm particle dispersion obtained from Example 3. Polymer particles smaller than 2 μm were prepared by using the procedures of Example 5 except that, depending upon the desirable final particle size, different amounts of sodium dodecylbenzenesulfonate and initial charge of Mixture B were used. The outer stage polymerizations were carried out using the procedures of Examples 4 and 8. All polymer particles had the same core/shell ratio of 80/20.

The results of optical property testing of these particles are shown in Table II.

TABLE Ia

Properties of Blends of PMMA and Polymer Particles

| Example No. | Polymer Particles Approx. Thickness mil | $N_D^{25}$ Inner Stage Polymer | Outer stage Polymer | Size um |
|---|---|---|---|---|
| 10 | 40 | 1.463 | PMMA | 9 |
| 11 | " | " | " | 8 |
| 12 | " | " | " | " |
| 13 | " | " | " | 5 |
| 14 | " | 1.522 | " | " |
| 15 | " | 1.463 | " | " |
| 16 | " | " | " | 2 |
| 17 | " | " | " | " |
| 18 | " | " | " | 0.4 |
| 19 | " | " | " | " |
| 20 | " | " | " | 0.1 |
| 21 | " | " | " | " |
| 22 | 80 | " | " | 9 |
| 23 | " | " | " | 8 |
| 24 | " | " | " | " |
| 25 | " | " | " | 5 |
| 26 | " | 1.522 | " | " |
| 27 | " | 1.463 | " | 2 |
| 28 | " | " | " | " |
| 29 | " | " | " | 0.4 |
| 30 | " | " | " | " |
| 31 | " | " | " | 0.1 |
| 32 | " | " | " | " |

TABLE Ib

Optical Properties of Blends of PMMA and Polymer Particles

| Example No. | Conc'n Wt. % | Total Luminous Trans. % | Hiding Power | Haze % |
|---|---|---|---|---|
| 10 | 9.0 | 93 | 1.0 | 97 |
| 11 | 5.0 | 93 | 0.95 | 96 |
| 12 | 9.0 | 93 | 0.98 | 98 |
| 13 | 5.0 | 93 | 0.97 | 98 |

TABLE Ib-continued

Optical Properties of Blends of PMMA and Polymer Particles

| Example No. | Conc'n Wt. % | Total Luminous Trans. % | Hiding Power | Haze % |
|---|---|---|---|---|
| 14 | 5.0 | 93 | 0.97 | 96 |
| 15 | 9.0 | 92 | 1.0 | 98 |
| 16 | 5.0 | 92 | 0.57 | 97 |
| 17 | 9.0 | 90 | 0.63 | 98 |
| 18 | 5.0 | 80 | 0.029 | 64 |
| 19 | 9.0 | 69 | 0.0040 | 84 |
| 20 | 5.0 | 85 | 0.0045 | 10 |
| 21 | 9.0 | 79 | 0.0029 | 24 |
| 22 | 9.0 | 91 | 1.0 | 98 |
| 23 | 5.0 | 92 | 1.0 | 98 |
| 24 | 9.0 | 91 | 1.0 | 98 |
| 25 | 5.0 | 91 | 1.0 | 98 |
| 26 | 5.0 | 91 | 1.0 | 98 |
| 27 | 5.0 | 87 | 0.83 | 98 |
| 28 | 9.0 | 77 | 1.0 | 99 |
| 29 | 5.0 | 68 | 0.051 | 83 |
| 30 | 9.0 | 61 | 0.044 | 88 |
| 31 | 5.0 | 82 | 0.0049 | 15 |
| 32 | 9.0 | 72 | 0.0034 | 28 |

EXAMPLES 33–89

These examples illustrate the use of core/shell polymer particles of the present invention with different matrix polymers having different refractive indices. Because the refractive indices of the core polymers prepared in Examples 3 and 7 were adjusted to be suitable for poly(methyl methacrylate), the core/shell polymers of Examples 4 and 8 were not optimal for most of these matrix polymers. Using the procedures of Examples 1–4 or 5–8, core/shell polymer particles of the present invention were prepared by adjusting the butyl acrylate/styrene ratio to achieve the refractive index appropriate to the matrix polymer. All polymer particles had the same core/shell ratio of 80/20. The resulting core/shell polymers were blended with the matrix polymers to produce light-scattering polymer compositions of the present invention. Table II shows the properties and processing conditions of the matrix polymers, and Tables III–VII show the properties of the matrix polymer-core/shell polymer blends of the present invention. Each blend was milled for 3–5 minutes.

TABLE II

| Matrix | Trade Name | Supplier | Temp. °F. | Temp. (°C.) | Milling/Molding Refractive Index |
|---|---|---|---|---|---|
| PMMA | Plexiglas V-920 | Rohm and Haas | 450 | (232) | 1.49 |
| PS | Styron 666U | Dow Chem. Co. | 400 | (204) | 1.59 |
| PC | Merlon M-39 | Mobay Chem. Co. | 480 | (249) | 1.585 |
| PVC[a] | Oxyblend 161J | Occidental Chem. Corp. | 340 | (171) | 1.54 |
| PVAc[b] | | Polysciences | 320 | (160) | 1.467 |
| P(MMA/aMS)[c] | | Rohm and Haas Co. | 410 | (210) | 1.52 |

[a]Contains stabilizers and processing aid in formulation; no impact modifier or plasticizer. Refractive index given is for PVC homopolymer.
[b]Weight-average molecular weight is 500,000.
[c]Methyl methacrylate/alpha-methylstyrene/ethyl acrylate, 73.5/24.5/2; Wt-Avg. MW = 115,000.

The following examples illustrate polymer compositions of the present invention prepared by blending different matrix polymers with the light-scattering particles of the present invention. As the tables indicate, the 5 um particles diffuse light better than the smaller particles, which show a decrease in either total luminous transmittance or hiding power. These examples illustrate that blends of the particles of this invention with polystyrene, polycarbonate, poly(vinyl chloride), poly(vinyl acetate) and poly(methyl methacrylate-co-alpha-methylstyrene) are effective light diffusers with good light transmittance.

TABLE III[a]

Optical Properties of Blends of Polystyrene (PS) and Polymer Particles

| Example No. | Approx. Thickness, mil | $n_D^{25}$ Inner Stage Polymer | Outer Stage Polymer | Size um | Conc. Wt. % |
|---|---|---|---|---|---|
| 33 | 40 | — | — | — | 0 |
| 34 | " | 1.560 | PS | 5 | 5.0 |
| 35 | " | " | " | 2 | " |
| 36 | " | " | " | " | 10 |
| 37 | 80 | — | — | — | 0 |
| 38 | " | 1.560 | PS | 5 | 5.0 |
| 39 | " | " | " | 2 | " |
| 40 | " | " | " | " | 10 |

TABLE IIIb

Optical Properties of Blends of Polystyrene (PS) and Polymer Particles

| Example No. | Total Luminous Transmittance, % | Hiding Power | Haze % |
|---|---|---|---|
| 33 | 92 | 0.0038 | 7.5 |
| 34 | 91 | 1.0 | 97 |
| 35 | 89 | 0.11 | 95 |
| 36 | 78 | 0.96 | 98 |
| 37 | 90 | 0.0036 | 9.6 |
| 38 | 84 | 1.0 | 98 |
| 39 | 85 | 0.60 | 98 |
| 40 | 78 | 0.96 | 99 |

TABLE IVa

Optical Properties of Blends of Polycarbonate and Polymer Particles

| Example No. | Approx. Thickness, mil | $N_D^{25}$ Inner Stage Polymer | Outer Stage Polymer | Size um | Conc. Wt. % |
|---|---|---|---|---|---|
| 41 | 40 | — | — | — | 0 |
| 42 | " | 1.560 | PMMA | 5 | 3.0 |
| 43 | " | " | " | " | 5.0 |
| 44 | " | " | " | " | 7.0 |
| 45 | " | " | " | 2 | 3.0 |
| 46 | " | " | " | " | 5.0 |
| 47 | 80 | — | — | — | 0 |
| 48 | " | 1.560 | PMMA | 5 | 3.0 |
| 49 | " | " | " | " | 5.0 |
| 50 | " | " | " | " | 7.0 |

TABLE IVa-continued

Optical Properties of Blends of Polycarbonate and Polymer Particles

| Example No. | Approx. Thickness, mil | $N_D^{25}$ Inner Stage Polymer | Outer Stage Polymer | Size um | Conc. Wt. % |
|---|---|---|---|---|---|
| 51 | " | " | " | 2 | 3.0 |
| 52 | " | " | " | " | 5.0 |

TABLE VIb

Optical Properties

| Example No. | Total Luminous Transmittance, % | Hiding Power | Haze % |
|---|---|---|---|
| 41 | 90 | 0.0048 | 6.5 |
| 42 | 87 | 0.91 | 96 |
| 43 | 82 | 1.0 | 97 |
| 44 | 76 | 1.0 | 98 |
| 45 | 77 | 0.77 | 98 |
| 46 | 69 | 1.0 | 99 |
| 47 | 90 | 0.0073 | 7.6 |
| 48 | 81 | 0.97 | 98 |
| 49 | 72 | 1.0 | 99 |
| 50 | 65 | 1.0 | 99 |
| 51 | 67 | 1.0 | 99 |
| 52 | 57 | 1.0 | 99 |

TABLE Va

Properties of Blends of Poly(vinyl chloride) (PVC) and Polymer Particles

| Example No. | Approx. Thickness, mil | $n_D^{25}$ Inner Stage Polymer | Outer Stage Polymer | Size um | Conc. Wt. % |
|---|---|---|---|---|---|
| 53 | 40 | 1.515 | PMMA | 5 | 5.0 |
| 54 | " | " | " | " | 10 |
| 55 | " | " | " | 2 | 5.0 |
| 56 | " | " | " | " | 10 |
| 57 | 80 | — | — | — | 0 |
| 58 | " | 1.515 | PMMA | 5 | 5.0 |
| 59 | " | " | " | " | 10 |
| 60 | " | " | " | 2 | 5.0 |
| 61 | " | " | " | " | 10 |

TABLE Vb

Optical Properties of Blends of Poly(Vinyl Chloride) (PVC) and Polymer Particles Optical Properties

| Example No. | Total Luminous Transmittance, % | Hiding Power | Haze % |
|---|---|---|---|
| 53 | 80 | 0.96 | 98 |
| 54 | 72 | 1.0 | 98 |
| 55 | 70 | 0.89 | 97 |
| 56 | 66 | 1.0 | 98 |
| 57 | 75 | 0.0035 | 7.5 |
| 58 | 66 | 1.0 | 98 |
| 59 | 59 | 1.0 | 99 |
| 60 | 52 | 0.93 | 98 |
| 61 | 47 | 1.0 | 99 |

TABLE VIa

Optical Properties of Blends of Poly(vinyl acetate) (PVAc) and Polymer Particles

| Example No. | Approx. Thickness, mil | $n_D^{25}$ Inner Stage Polymer | Outer Stage Polymer | Size um | Conc. Wt. % |
|---|---|---|---|---|---|
| 62 | 40 | — | — | — | 0 |
| 63 | " | 1.500 | PVAc | 5 | 5.0 |
| 64 | " | 1.491 | PMMA | " | " |
| 65 | " | 1.500 | PVAc | " | 10 |
| 66 | " | 1.491 | PMMA | " | " |
| 67 | " | 1.500 | PVAc | 2 | 5.0 |
| 68 | " | " | " | " | 10 |
| 69 | 80 | — | — | — | 0 |
| 70 | " | 1.500 | PVAc | 5 | 5.0 |
| 71 | " | 1.491 | PMMA | " | " |
| 72 | " | 1.500 | PVAc | " | 10 |
| 73 | " | 1.491 | PMMA | " | " |
| 74 | " | 1.500 | PVAc | 2 | 5.0 |
| 75 | " | " | " | " | 10 |

TABLE VIb

Optical Properties of Blends of Poly(Vinyl Acetate) (PVAc) and Polymer Particles Optical Properties

| Example No. | Total Luminous Transmittance, % | Hiding Power | Haze % |
|---|---|---|---|
| 62 | 92 | 0.0046 | 3.7 |
| 63 | 91 | 0.98 | 98 |
| 64 | 90 | 1.0 | 98 |
| 65 | 89 | 1.0 | 99 |
| 66 | 86 | 1.0 | 98 |
| 67 | 89 | 0.19 | 98 |
| 68 | 88 | 0.75 | 97 |
| 69 | 88 | 0.0038 | 5.5 |
| 79 | 87 | 1.0 | 99 |
| 71 | 85 | 1.0 | 98 |
| 72 | 81 | 1.0 | 98 |
| 73 | 74 | 1.0 | 99 |
| 74 | 79 | 0.95 | 98 |
| 75 | 75 | 1.0 | 99 |

TABLE VIIa

Poly(Methyl Methacrylate-co-alpha-Methylstyrene) and Polymer Particles

| Example No. | Approx. Thickness, mil | $n_D^{25}$ Inner Stage Polymer | Outer Stage Polymer | Size um | Conc. Wt. % |
|---|---|---|---|---|---|
| 76 | 40 | — | — | — | 0 |
| 77 | " | 1.463 | PMMA | 5 | 0.30 |
| 78 | " | " | " | " | 0.50 |
| 79 | " | " | " | " | 0.70 |
| 80 | 80 | — | — | — | 0 |
| 81 | " | 1.463 | PMMA | 5 | 0.30 |
| 82 | " | " | " | " | 0.50 |
| 83 | " | " | " | " | 0.70 |
| 84 | " | 1.490 | " | " | 1.50 |
| 85 | " | " | " | " | 3.0 |
| 86 | " | 1.500 | P(MMA/aMS) | " | 1.50 |
| 87 | " | " | " | " | 3.0 |
| 88 | " | 1.490 | " | 2 | 1.5 |
| 89 | " | " | " | " | 3.0 |

TABLE VIIb

Poly(Methyl Methacrylate-co-alpha-Methylstyrene) and Polymer Particles

| Example No. | Total Luminous Transmittance, % | Hiding Power | Haze % |
|---|---|---|---|
| 76 | 92 | 0.0044 | 6.5 |
| 77 | 90 | 0.076 | 59 |
| 78 | 90 | 0.30 | 85 |
| 79 | 90 | 0.32 | 86 |
| 80 | 91 | 0.0068 | 9.5 |
| 81 | 88 | 0.13 | 77 |
| 82 | 86 | 0.81 | 95 |
| 83 | 86 | 0.89 | 96 |
| 84 | 82 | 0.95 | 97 |
| 85 | 78 | 1.0 | 98 |
| 86 | 78 | 0.78 | 94 |
| 87 | 58 | 0.98 | 99 |
| 88 | 63 | 0.24 | 99 |
| 89 | 56 | 0.97 | 100 |

EXAMPLES 90–94

These examples illustrate the optical properties of certain blends of spherical polymer particles with poly(methyl methacrylate).

TABLE VIII

Optical Properties of blends of Poly(methyl methacrylate) (PMMA) and 5 Micrometer Polymer Particles

| Example No. | Blend Approx. Thickness, cm. | Polymer Particles $n_D^{25}$ | Conc'n Wt. % | Trans. % | Hiding Power | Haze % |
|---|---|---|---|---|---|---|
| 90 | 0.20 | 1.46 | 0 | 93 | 0.0038 | 1.2 |
| 91 | 0.20 | 1.46 | 2.5 | 89 | 1.0 | 98 |
| 92 | 0.20 | 1.46 | 3.5 | 89 | 1.0 | 98 |
| 93 | 0.20 | 1.46 | 5.0 | 88 | 1.0 | 98 |
| 94 | 0.20 | 1.46 | 10.0 | 80 | 1.0 | 99 |

EXAMPLES 95–119

These examples illustrate the use of spherical polymer particles of the present invention with different matrix polymers having different refractive indices. Because of the refractive indices of the spherical polymer particles prepared in Examples 7, 9 and 90–94 were adjusted to be suitable for poly(methyl methacrylate), those spherical polymer particles of Examples 5 and 90 were not optimal for other matrix polymers. Using the procedures of Examples 5–7, spherical polymer particles of the present invention were prepared by adjusting the butyl acrylate/styrene ratio to achieve the refractive index appropriate to the matrix polymer. The resulting spherical polymer particles were blended with the matrix polymers to produce light-scattering polymer compositions of the present invention. Table IX shows the properties and processing conditions of the matrix polymers, and Tables X through XV indicate the refractive index and particle size of particulate polymers suitable for preparing the matrix polymer-particle blends of the present invention. Each blend was milled for 3–5 minutes at condiations shown in Table IX for the matrix control.

TABLE IX

Suitable Matrix Polymer

| Matrix | Milling Molding Temp. °C. | Refractive Index |
|---|---|---|
| Poly(methyl methacrylate) (Ex. 90–94) | 232 | 1.49 |
| Polystyrene | 204 | 1.59 |
| Polycarbonate (PC) | 219 | 1.585 |
| Poly(vinyl chloride) (a) (PVC) | 171 | 1.54 |
| Poly(vinyl acetate) (b) (PVAc) | 160 | 1.467 |
| Poly(methyl methacrylate)/co-alpha methylstyrene (c) P(MMA/aMS) | 210 | 1.52 |
| Poly(N-methyl glutarimide) (d) (PGI) (e) | 219 | 1.53 |

(a) Contains stabilizers and processing aid in formulation; no impact modifier or plasticizer. Refractive index given was PVC homopolymer.
(b) Weight-average molecular weight was 500,000.
(c) Methyl methacrylate/alpha-methylstyrene/ethyl acrylate, 73.5/24.5/2; Wt-Avg. MW = 115,000
(d) Prepared from PMMA and methylamine by method of Kopchik, U.S. Pat. No. 4,246,374 to a degree of imidization producing a Vicat softening point of the resulting polymer of 150° C.

TABLE X

Optical Properties of Blends of Polystyrene (PS) and 5 Micrometer Polymer Particles

| Example No. | Blend Approx. Thickness, cm. | Polymer Particles $n_D^{25}$ | Conc'n Wt. % | Trans. % | Hiding Power | Haze % |
|---|---|---|---|---|---|---|
| 95 | 0.20 | 1.56 | 0 | 90 | 0.0041 | 9.4 |
| 96 | 0.20 | 1.56 | 2.5 | 85 | 0.74 | 96 |
| 97 | 0.20 | 1.56 | 3.5 | 85 | 0.96 | 98 |
| 98 | 0.20 | 1.56 | 5.0 | 86 | 0.99 | 98 |
| 99 | 0.20 | 1.56 | 10 | 82 | 1.00 | 98 |

TABLE XI

Optical Properties of Blends of Polycarbonate (PC) and 5 Micrometer Polymer Particles

| Example No. | Blend Approx. Thickness, cm. | Polymer Particles $n_D^{25}$ | Conc'n Wt. % | Trans. % | Hiding Power | Haze % |
|---|---|---|---|---|---|---|
| 100 | 0.20 | 1.56 | 0 | 85 | 0.0039 | 9.7 |
| 101 | 0.20 | 1.56 | 2.5 | 75 | 0.072 | 83 |
| 102 | 0.20 | 1.56 | 3.5 | 75 | 0.44 | 97 |
| 103 | 0.20 | 1.56 | 5.0 | 75 | 0.96 | 98 |
| 104 | 0.20 | 1.56 | 7.0 | 70 | 0.98 | 98 |

TABLE XII

Optical Properties of Blends of Poly(vinyl chloride) (PVC) and 5 Micrometer Polymer Particles

| Example No. | Blend Approx. Thickness, cm. | Polymer Particles $n_D^{25}$ | Conc'n Wt. % | Trans. % | Hiding Power | Haze % |
|---|---|---|---|---|---|---|
| 105 | 0.20 | 1.51 | 0 | 73 | 0.0075 | 7.8 |
| 106 | 0.20 | 1.51 | 2.5 | 61 | 0.99 | 98 |
| 107 | 0.20 | 1.51 | 3.5 | 66 | 1.0 | 98 |
| 108 | 0.20 | 1.51 | 5.0 | 66 | 0.99 | 98 |

TABLE XIII

Optical Properties of Blends of Poly(vinyl acetate) (PVAc) and 5 Micrometer Polymer Particles

| Example No. | Blend Approx. Thickness, cm. | Polymer Particles $n_D^{25}$ | Conc'n Wt. % | Trans. % | Hiding Power | Haze % |
|---|---|---|---|---|---|---|
| 109 | 0.20 | 1.50 | 0 | 91 | 0.0044 | 5.2 |
| 110 | 0.20 | 1.50 | 2.5 | 76 | 1.0 | 98 |
| 111 | 0.20 | 1.50 | 5.0 | 69 | 1.0 | 99 |

TABLE XIV

Optical Properties of Blends of Poly(methyl methacrylate-co-alpha-methylstyrene) and 5 Micrometer Polymer Particles

| Example No. | Blend Approx. Thickness, cm. | Polymer Particles $n_D^{25}$ | Polymer Particles Conc'n Wt. % | Optical Properties Trans. % | Optical Properties Hiding Power | Optical Properties Haze % |
|---|---|---|---|---|---|---|
| 112 | 0.20 | 1.49 | 0 | 92 | 0.0030 | 2.2 |
| 113 | 0.20 | 1.49 | 1.5 | 67 | 0.74 | 98 |
| 114 | 0.20 | 1.49 | 2.5 | 57 | 0.99 | 99 |
| 115 | 0.20 | 1.49 | 5.0 | 57 | 1.0 | 99 |

TABLE XV

Optical Properties of Blends of Poly(N-methyl glutarimide) and 5 Micrometer Polymer Particles

| Example No. | Blend Approx. Thickness, cm. | Polymer Particles $n_D^{25}$ | Polymer Particles Conc'n Wt. % | Optical Properties Trans. % | Optical Properties Hiding Power | Optical Properties Haze % |
|---|---|---|---|---|---|---|
| 116 | 0.20 | 1.50 | 0 | 92 | 0.0036 | 2.2 |
| 117 | 0.20 | 1.50 | 0.5 | 71 | 0.071 | 79 |
| 118 | 0.20 | 1.50 | 1.5 | 61 | 0.50 | 98 |
| 119 | 0.20 | 1.50 | 2.5 | 56 | 1.0 | 99 |

EXAMPLE 120

This example illustrates blending of the modifier of Examples 91–94 into an acrylic matrix by a masterbatching technique. The modifier employed in those examples (35 parts) is admixed with a commercial acrylic molding powder, having a composition of MMA/EA=95/5 and a MW of about 160,000. The materials are blended in a 25.4 mm Killion extruder at a barrel temperature of 218° C. Portions of this masterbatch are further diluted with the commercial acrylic molding powder by re-extrusion under the same conditions to give the desired lower level of particulate polymer. Plaques or sheets formed from these admixtures will demonstrate a balance of light transmittance and light scattering similar to those direct blends exemplified in Examples 91–94 and will be suitable for uses such as skylighting and internally illuminated signs.

EXAMPLE 121

This example illustrates growing 2 μm-diameter particles of uniform size from the 0.3 μm-diameter particles of Example 1, using an emulsion of butyl acrylate with butylene glycol diacrylate crosslinking monomer and allyl methacrylate graftlinking monomer. The following aqueous mixtures were prepared:

| Mixture | Component | Parts by Weight |
|---|---|---|
| A | Butyl Acrylate | 98 |
|   | Butylene Glycol Diacrylate | 0.50 |
|   | Allyl Methacrylate | 2.0 |
|   | Benzoyl Peroxide | 0.80 |
| B | Magnesium p-Nitrosophenolate | 0.011 |
|   | Water | 226 |
|   | 10% aqueous Sodium Dodecylbenzenesulfonate | 3.1 |
| C | The polymer emulsion of Example 1 | 1.5 |

Mixture A was blended with Mixture B in a Waring Blender for 3 minutes to form an emulsion. This emulsion was charged to a pressure reactor with Mixture C, and the reactor contents were stirred under a nitrogen blanket for 1 hour. The reactor was sealed, shaken in a water bath at 68° C. for 3 hours, and cooled to room temperature. The polymer particles from the reaction mixture, when examined by optical microscopy, were uniformly sized and about 2 μm in diameter.

EXAMPLES 122–136

These examples illustrate the preparation of polymers useful as surface-altering agents for clear poly(vinyl chloride). A series of polymers were prepared by the teaching of U.S. Pat. No. 4,186,120. They were not removed from their aqueous media, but were obtained at about 15% solids. Prior to use, they could be readily redispersed in the aqueous media by shaking or stirring.

TABLE XVI

Composition and Particle Size of Surface-Altering Agents

| Example | Composition | Particle Size, μm |
|---|---|---|
| 122 | BA/St/ALMA 37/60/3 | 2.1 |
| 123 | BA/St/ALMA 37/60/3 | 3.3 |
| 124 | BA/St/ALMA 37/60/3 | 5.2 |
| 125 | BA/St/ALMA 37/60/3 | 8.2 |
| 126 | BA/St/DVB 37/60/3 | 3.3 |

BA = n-butyl acrylate; St = styrene; ALMA-allyl methacrylate; DVB = divinylbenzene A dry blend was prepared of PVC resin of K value 59 (geon 110-45) 100 parts, dibutyltin di(alkyl mercaptoacetate) tin stabilizer 2 phr (parts per hundred parts of resin), diisodecyl phthalate plasticizer 50 phr, and stearic acid 0.5 phr. While milling on a two-mill roll, an amount of emulsion of the polymers of Example 122 was added at a weight of solids of 0.5 to 1.0 phr. The water evaporated immediately, and the flatting agent was dispersed at roll speeds of 26/20 for 5 minutes at 162° C. After 3 minutes into the compounding, a sufficient quantity of the stock was removed from the mill to yield a pencil thin rolling blank to subsequently produce a sheet about 0.003 cm thick. After a total of five minutes of mill roll processing, the stock was removed from the mill and allowed to cool on a flat surface (mill side down). A representative 10 by 12.5 cm piece was cut from each sheet, taped, mill side up, to a rigid substrate, spray painted with three coats of a flat black paint and allowed to dry. The surface gloss was measured on the unpainted side following ASTM D532 using a Hunterlab Glossmeter Model D487. The measurement angles were at 60° and at 85° to the incident light.

A ground, styrene-acrylic flatting agent which exhibits a very broad particle size distribution, 1–50 μm, was dispersed into the PVC melt and tested as a control; it was used in Example 128, and also in Example 138, below. Duplicate numbers show a repeated experiment.

TABLE XVII

EFFECT OF ADDITIVE PARTICLE SIZE ON SURFACE REFLECTANCE

| Example | Additive of Example | Amount phr | Hunter Gloss 60° | Hunter Gloss 85° |
|---|---|---|---|---|
| 127 | None | — | 79,81 | 88,92 |
| 128 | Sty-Acr | 1.3 | 13 | 19 |
| 129 | 122 | 1.0 | 17 | 35 |
| 130 | 123 | 0.5 | 22 | 40 |
| 131 | 123 | 1.0 | 18 | 31 |
| 132 | 124 | 0.5 | 21 | 24 |
| 133 | 124 | 1.0 | 13 | 16 |
| 134 | 125 | 0.5 | 24 | 29 |

TABLE XVII-continued

EFFECT OF ADDITIVE PARTICLE SIZE ON SURFACE REFLECTANCE

| Example | Additive of Example | Amount phr | Hunter Gloss 60° | Hunter Gloss 85° |
|---|---|---|---|---|
| 135 | 125 | 1.0 | 13 | 15 |
| 136 | 126 | 1.0 | 68 | 95 |

The additives of Examples 134 (5.2 μm) and 135 (8.8 μm) were more efficient at 1.0 phr than the commercially accepted control at 1.3 phr. The additive of Example 136, crosslinked with divinylbenzene, was apparently not sufficient crosslinked to exhibit flatting as pronounced as the commercial control, although a diminution over the unmodified sample was noted.

EXAMPLES 137-144

These examples illustrate the use of similar additives in the surface-alternation of flatting of extruded rigid poly(vinyl chloride) sheet. The formulation utilized for the testing was as follows, where phr was parts per hundred parts of PVC resin:

| | |
|---|---|
| PV homopolymer, K = 69 | 100 parts |
| Dimethyltin di(alkyl mercaptoacetate) | 1.6 phr |
| Wax, paraffin type | 1.0 |
| Calcium stearate | 1.3 |
| Titanium dioxide | 10 |
| Acrylic processing aid | 0.5 |
| Acrylic lubricating processing aid | 1.0 |
| Acrylic impact modifier | varied |
| Flatting additive | varied |

The equipment for the test was a Haake Rheocord (EU5) and the Haake Rheomix 252 1.9 cm extruder fitted with a 3/1 compression ratio, single-stage screw and a 7.62 cm by 0.12 cm "coathanger" die. The zone temperature settings wer Z1=175° C., Z2=185° C., Z3=195° C. and die=195° C.

The additive used in Example 138 is a comparative flatting agent of ground stryene-acrylic polymer having a particle size distribution of 1-50 μm.

If the polymeric additive was available in dry form, a dry blend was prepared as a masterbatch, without the impact modifier and flatting additive, in a high intensity blender. The modifier and flatting addtive were blended just prior to extrusion into sheet. The surface gloss of the extruded sheet samples was measured on the white sheet samples using the Hunterlab gloss meter. If the surface-altering agent was in emulsion form, it was stirred and admixed with the above blend in powder form. The blend was then dried in vacuo at 60° C. for three days.

A Gardner gloss test, similar to the Hunter values but using a Glossgard II Glossmeter (Gardner Instruments Division, Pacific Scientific) was also applied in this study.

TABLE XVIII

GLOSS RESULTS ON SURFACE-ALTERED RIGID PVC SIDING

| Example | Additive from Example | Additive Level | Gardner Gloss, 60° | Hunter Gloss 60° | Hunter Gloss 85° |
|---|---|---|---|---|---|
| 137 | None | — | 63 | 64 | 96 |
| 138 | Sty-Acr | 1.3 | 15.5 | 15.5 | 19 |
| 139 | 1 | 0.5 | 30 | 31 | 66 |
| 140 | 1 | 1.0 | 21.5 | 21.5 | 44 |
| 141 | 1 | 2.0 | 13.5 | 14 | 22 |
| 142 | 4 | 0.5 | 24 | 23.5 | 32 |
| 143 | 4 | 1.0 | 14 | 14.5 | 19 |
| 144 | 4 | 2.0 | 9 | 9 | 10 |

EXAMPLE 145

This example illustrates the use of such spherical polymer particles for altering the surface appearance of a poly(methyl methacrylate) sheet matrix. A terpolymer is prepared by the method of Example 122, having a composition of methyl methacrylate/butyl methacrylate/DVB=47.5/50/2.5 and a particle size of about eight micrometer. The terpolymer is admixed with 90 parts of a commercial acrylic molding resin, which is a methyl methacrylate polymer with a small amount of copolymerized alkyl acrylate, having a melt viscosity of about 5600 poises at 400 sec$^{-1}$ and 246° C. After tumbling the dry polymers for several minutes, the mixture is pelletized by extrusion through a small Killion 2.54 cm extruder at a melt temperature of about 260° C. through a strand die, utilizing a high work screw. The resultant pellets are extruded with a medium work screw at a melt temperature of 242°-249° C., equipped with a 15.2 cm flat sheet die. The sheet is directly passed into two heated polished rolls (79° C.) set at a 2.5-mm sheet setting. The resulting sheet exhibits low gloss, low internal haze, little decrease in impact resistance, and a slight loss in service temperature relative to an extrusion of V-045-100 alone; only slightly higher melt viscosity will be observed.

EXAMPLES 146-147

These examples illustrate the use of a core/shell polymer prepared according to Examples 1-5.

A particulate polymer of 5 μm particle size having the composition butyl acrylate 76.8/allyl methacrylate 3.2//methyl methacrylate 19.2/ethyl acrylate 0.80 was prepared according to the procedure taught in Examples 1-5. This polymer was blended with a methyl methacrylate molding resin as taught in Example 145 and a commercial impact-modified clear methacrylic resin, so that the mixture contained equal amounts of both matrix polymers. Processing was by the procedure of Example 145. Testing was on 1.8-mm extruded sheet. When this formulation was tested in injection or compression molded samples, no reduction of gloss was observed.

TABLE XIX

Effect of Core/Shell Particulate Polymer of Narrow Particle Size Distribution on Gloss of Impact-Modified Acrlic Sheet

| Example | Particulate Additive, Wt % | Total Luminous Transmittance % | Hunter Gloss 60° |
|---|---|---|---|
| 146 | None | 92 | 97 |
| 147 | 2.8 | 92 | 50,52 |

EXAMPLE 148

This example illustrates a laboratory procedure for preparing polymers of the present invention which may be used as single phase particles or as cores for core/shell particles; the procedure is based on the initial preparative steps described by Ugelstad, U.S. Pat. No. 4,186,120. A preform seed is used to prepare an oligomer seed, which in turn is used to prepare the initiator seed. The initiator seed is then added to the reactor, swelled with monomer and the polymerization initiated by heating the reactor to the desired temperature. The polymer shown herein is refractive-index-matched to poly(vinyl chloride).

1. Preform Seed Preparation

| Material | | Grams |
|---|---|---|
| (A) | Deionized (DI) water | 1912 |
| | $Na_2CO_3$ | 4.0 |
| (B) | Butyl acrylate (BA) | 1055.7 |
| | Butylene diacrylate | 2.7 |
| | Allyl methacrylate (ALMA) | 21.6 |
| | Sodium dodecylbenzene sulfonate, 10% aqueous solution (NaDDBS) | 54.0 |
| | DI water | 324.0 |
| | Rinse | 25 |
| | Rinse | 25 |
| (C) | Potassium persulfate (KPS) | 0.68 |
| | DI Water | 160.0 |
| | Rinse | 25 |
| | Rinse | 25 |

Procedure

Solution (A) is charged to a suitable reaction vessel equipped with stirrer, nitrogen sparge, and means for addition of reagents during the reaction. The mixture is sparged with nitrogen, heated to 82° C. with stirring, and held for one hour. 10% of the (B) charge and 25% of the (C) charge are added and held until 96% conversion is achieved. The remainder of feeds (B) and (C) are added through separate charging orifices over two hours while the temperature is maintained at 81°–83° C.; after the feeds are complete, the mixture is maintained at 80° C. for one hour, cooled and filtered through cheese cloth.

2. Oligomer feed preparation

| Material | | Grams |
|---|---|---|
| (A) | DI Water | 1000.0 |
| | $Na_2CO_3$ | 0.44 |
| | preform seed from 1 | 163.59 |
| (B) | BA | 443.15 |
| | Styrene | 98.39 |
| | NaDDBS (10% aq.) | 13.54 |
| | DI Water | 150.0 |
| | Rinse | 25.0 |
| (C) | 1-Hexanethiol | 101.78 |
| | NaDDBS (10% aq.) | 15.41 |
| | DI Water | 51.0 |
| | Rinse | 25.0 |
| (D) | KPS | 0.58 |
| | DI Water | 90.0 |
| | Rinse | 25.0 |
| (E) | Chase | 0.40 |
| | t-Butyl hydroperoxide, 70% (tBHP70X) | |
| | DI Water | 15.0 |
| (F) | Sodium formaldehyde hydrosulfite (3%) sol | 9.0 |

To a reactor similar to that used for the initial seed is charged solution (A), which is then heated to 88° C. and held for one hour with nitrogen sparging. The sparge is changed to a sweep, and in three separate streams are added mixtures (B), (C), and (D) over three hours. The mixture is held at 88° C. for 90 minutes, cooled to 70° C., solutions (E) and (F) added, and the mixture stirred for 30 minutes longer. After cooling the reaction mixture is filtered through cheese cloth.

3. Initiator Seed Preparation

| Materials | | Grams |
|---|---|---|
| (A) | NaDDBS (10% aq.) | 6.4 |
| | DI Water | 200.0 |
| (B) | t-Butyl peroctate | 160.0 |
| (C) | Oligomer Seed of 2 | 33.46 |

To a reactor similar to, but larger than, that used for seed and oligomer preparations is charged (A) and (B), which mixture is stirred vigorously for five minutes at room temperature. The oligomer seed (C) is then charged and stirred for two hours at room temperature.

4. Swelling

| Materials | | Grams |
|---|---|---|
| (A) | Styrene | 633.6 |
| | BA | 390.72 |
| | ALMA | 31.68 |
| (B) | Siponate DS10 (10% sol) | 52.8 |
| | DI Water | 2000.0 |
| | p-Nitrosophenol, Mg salt | 0.136 |
| (C) | Initiator Seed of 3 | 44.84 |

Procedure

Solutions (A) and (B) are stirred together vigorously to form an emulsion. The emulsion is then charged to a Gaulin two-stage homogenizer set at 52.5 kg/cm$^2$ (stage I) and 350 kg/cm$^2$ (stage II) and admixed for at least five minutes to form a microemulsion of monomers. To a reactor similar to that used in the previous step is charged the microemulsion; it is stirred for five minutes while being sparged with nitrogen. The sparge is continued while the initiator seed is added. Vigorous stirring is employed for 5 minutes and slow stirring for 2.5 hours. The emulsion is checked by optical microscopy to see that swelling has been achieved.

The sparge is changed to a sweep, and the batch is heated to 80° C. to initiate the polymerization. An increase in stirring speed may be employed. The reaction exotherm carries the temperature of 87° C. Fifteen minutes after the temperature reached 80° C., a feed of 22.6 parts of bis(tridecyl sodium sulfosuccinate) in 345 parts of water is begun and continued over a two-hour period. The mixture is held at 80° C. for one hour after completion of the emulsifier feed, and is cooled and filtered through cheese cloth.

EXAMPLE 149-164

These examples illustrate the incorporation of the particulate polymers of the present invention into additional matrix polymers, and the gloss reductions which result from that incorporation.

The polymer of Example 148 was dried from emulsion and dry-blended by hand into the following plastic matrices. The dry blends were mixed in the screw action of an Arburg 270/90/350 injection molding apparatus (screw speed 400 rpm) and were directly injection molded (mold temperature 100° C.) into plaques. The gloss values were measured as described for Examples 122–126. There was no attempt to match the refractive index of the particle polymer with that of the matrix. It is believed that better mixing and higher values of gloss reduction will occur with pre-compounding prior to molding.

TABLE XX

| Example | Matrix | Level of Modifier, phr | Barrel Temperatures, °C. | | | |
|---|---|---|---|---|---|---|
| | | | Feed | Center | Metering | Nozzle |
| 149 | Polycarbonate (1) | 0 | 267 | 274 | 286 | 298 |
| 150 | " | 2 | 267 | 274 | 286 | 298 |
| 151 | " | 5 | 267 | 274 | 286 | 298 |
| 152 | Acrylic (2) | 0 | 238 | 242 | 242 | 249 |
| 153 | " | 2 | 238 | 242 | 242 | 249 |
| 154 | " | 5 | 238 | 242 | 242 | 249 |
| 155 | Sty/MAnhyd (3) | 0 | 238 | 242 | 242 | 249 |
| 156 | " | 2 | 238 | 242 | 242 | 249 |
| 157 | Nylon 6 (4) | 0 | 238 | 242 | 242 | 249 |
| 158 | " | 2 | 238 | 242 | 242 | 249 |
| 159 | ABS (5) | 0 | 238 | 242 | 242 | 249 |
| 160 | " | 2 | 238 | 242 | 242 | 249 |
| 161 | " | 5 | 238 | 242 | 242 | 249 |
| 162 | PBT (6) | 0 | 238 | 242 | 242 | 249 |
| 163 | " | 2 | 238 | 242 | 242 | 249 |
| 164 | " | 5 | 238 | 242 | 242 | 249 |

Notes:
(1) Lexan 141, a bis-phenol-A-polycarbonate molding resin from General Electric Company
(2) Plexiglas V-811, a poly(methyl methacrylate) of about 110,000 MW from Rohm and Haas Company
(3) Dylark 350, a styrene//15% maleic anhydride copolymer containg a rubbery phase, from Arco Corp.
(4) Capron 8202, a polycaprolactam molding resin from Allied Chemical Corp.
(5) Cyclolac GSE-1000, a molding grade acrylonitrile/butadiene/styrene from Borg-Warner Corp.
(6) Valox 315, a molding resin grade of poly(butylene terephthalate), General Electric Company.

The results of Hunter and Gardner gloss measurements, made as described previously, are shown below. The styrene/maleic anhydride polymer had low gloss without the additive, but some improvement was seen when measured at 85 degrees. The effect on the nylon was minimal. The poly(butylene terephthalate) control had a very poor surface, which reduced gloss, but gloss reduction can be noted when the level of spherical particle additive was increased from two to five percent.

TABLE XXI

| Example | Matrix | Level of Modifier, phr | Gloss | | |
|---|---|---|---|---|---|
| | | | Garner 60° | Hunter 60° | 85° |
| 149 | Polycarbonate | 0 | 99.8 | 94.4 | 94.6 |
| 150 | " | 2 | 55.8 | 58.9 | 51.6 |
| 151 | " | 5 | 33.1 | 40.4 | 35.8 |
| 152 | Acrylic | 0 | 85.5 | 87.2 | 99.8 |
| 153 | " | 2 | 65.2 | 67.5 | 87.2 |
| 154 | " | 5 | 39.1 | 37.3 | 50.3 |
| 155 | Sty/MAnhyd | 0 | 18.9 | 19.5 | 75.2 |
| 156 | " | 2 | 16.8 | 17.5 | 51.4 |
| 157 | Nylon 6 | 0 | 90.8 | 90.4 | 96.5 |
| 158 | " | 2 | 89.1 | 90.8 | 99.1 |
| 159 | ABS | 0 | 70.2 | 66.0 | 89.8 |
| 160 | " | 2 | 70.4 | 68.5 | 90.1 |
| 161 | " | 5 | 62.3 | 62.5 | 89.8 |
| 162 | PBT | 0 | 60.0 (7) | 54.5 | 72.5 |
| 163 | " | 2 | 92.4 | 98.4 | 93.7 |
| 164 | " | 5 | 86.6 | 84.8 | 88.8 |

(7) Very poor surface on control sample.

EXAMPLES 165–167

These examples illustrate that levels up to 12% of the particulate polymers can be effective in preparation of a light-transmitting acylic plastic with high hiding power. By the procedure of Examples 1–4, a particulate polymer was made of the composition (ignoring the particle-size setting steps) butyl acrylate 78/butylene glycol diacrylate 0.40/allyl methacrylate 1.6//methyl methacrylate 19.2/ethyl acrylate 0.80. The particle size was five micrometers. The polymer was isolated from the aqueous dispersion by coagulation with aqueous calcium hypophosphite coagulant and dried to remove residual water, and melt mixed with a commercial acrylic molding resin, believed to be of molecular weight about 110,000 and of composition MMA-/EA=96/4. The blended polymer was compression molded at 204° C. into 12.7 cm square plaques, and were evaluated for optical properties at room temperature by the method of Example 9. Three levels of particulate polymer were evaluated. The results are given in Table XXII.

TABLE XXII

| Poly(Methyl Methacrylate) and Polymer Particles | | | |
|---|---|---|---|
| Example | % of Modifier | Total Luminous Transmittance, % | Hiding Power |
| 165 | 5 | 93 | 1.0 |
| 166 | 9 | 92 | 1.0 |
| 167 | 12 | 91 | 1.0 |

EXAMPLE 168

This example illustrates the preparation of a particulate polymer prepared in the absence of a crosslinking monomer in the core. By the procedure of Example 165 was prepared and isolated a core/shell particulate polymer of five micrometers particle size and of composition butyl acrylate 76.8/allyl methacrylate 3.2//methyl methacrylate 19.2/ethyl acrylate 0.80.

EXAMPLES 169–172

These examples illustrate blending of the modifier of Example 168 into an acrylic matrix by a masterbatching technique. The modifier of Example 168 (35 parts) was admixed with a commercial acrylic molding powder, believed to have a composition of MMA/EA=95/5 and a MW of about 160,000. The materials were blended in a 25.4 mm Killion extruder at a barrel temperature of 218° C. A portion of the blend was saved for optical properties; other portions were further diluted with the commercial acrylic molding powder by re-extrusion under the same conditions to give the desired lower level of particulate polymer.

TABLE XXIII

| Blends from Poly(methyl methacrylate) Particle Masterbatch | |
|---|---|
| Blend | Wt. % Additive of Ex. 92 |
| 169 | 35 |
| 170 | 15 |
| 171 | 8 |
| 172 | 1.3 |

EXAMPLES 173–179

These examples illustrate the effectiveness of a particulate polymer of this invention at high use levels to obtain a desirable balance of optical properties; it further illustrates the utility of such a particulate polymer in achieving optical properties deemed commercially acceptable for specific end-use applications. Plaques were molded from blends 169–172 at 232° C. under conditions conventional for the molding powder without additives; plaques were about 3 mm in thickness. These plaques were compared with acrylic sheet sold for various diffusive lighting uses; these acrylic sheets are essentially poly(methyl methacrylate) modified with either inorganic particles or polystyrene of non-uniform particle size. The match with commercial acceptable optical performance was noted. In the comparative examples, the plot of normalized intensity vs. angle in degrees was a very close parallel. Improved transmittance of light and less yellowness was noted while retaining the desired high haze levels.

TABLE XXIV

Optical Properties of Poly(methyl methacrylate) Particle Blends Compared with Commercial Examples of Acrylic Sheet

| Utility | Example No. | Source | Total Luminous Transmittance % | Yellowness Index | Haze % |
|---|---|---|---|---|---|
| Lighting | 173-comparative | | 55 | +11.6 | 99.2 |
| | 174 | 95 | 72 | +3.4 | 98.5 |
| Sign | 175-comparative | | 34 | +14.4 | 99.6 |
| | 176 | 94 | 60 | +4.8 | 99.2 |
| Skylight | 177-comparative | | 78 | +6.4 | 96.4 |
| | 178 | 96 | 86 | +0.7 | 98.3 |
| | 179 | 97 | 87 | −1.7 | 95.6 |

EXAMPLES 180–184

These examples illustrate the use of a particulate modifier of this invention to alter the optical properties of a polyglutarimide resin of refractive index 1.53. The core/shell polymer was prepared as taught in Example 33 above; the refractive index of the core was 1.495, and the outer stage of shell was a copolymer of styrene/acrylonitrile 73/27. The core/shell ratio was 82:18/ The matrix polymer was a polymer of methyl methacrylate reacted with methylamine by the procedure taught in Kopchik, U.S. Pat. No. 4,246,374 to achieve a degree of imidization yielding a Vicat softening point for the polymer of about 150° C. The blends were prepared by extrusion on a single 2.54-cm vented Killion extruder at a barrel temperature of 232° C., and then plaques of 3.3 mm thickness were molded on a Newbury reciprocating injection molding machine with 42 gram capacity at a barrel temperature of 260° C. and a mold temperature of 99° C. Higher transmittance will be achieved if the refractive index of the core is raised to about 1.51.

TABLE XXV

Optical Properties of Poly(methyl glutarimide)/ Particle Blends

| Example No. | Concentration of Particulate Modifier, wt. % | Total Luminous Transmittance % | Hiding Power | Haze % |
|---|---|---|---|---|
| 180 control | 0 | 91 | 0.0045 | 7 |
| 181 | 0.5 | 68 | 0.23 | 89 |
| 182 | 1.0 | 59 | 0.71 | 97 |
| 183 | 1.5 | 54 | 1.0 | 99 |
| 184 | 2.0 | 50 | 1.0 | 99 |

EXAMPLES 185–188

Examples 185–188 illustrate the use of particulate polymers of the present invention to achieve good optical reference control with little sacrifice in total white light transmission and with retention of impact performance in an impact-modified clear acrylic plastic. The modifier of Example 168 was admixed at the 3, 5 and 10 phr level with pellets of a commercial impact-modified acrylic polymer, believed to be a butyl acrylate//methyl methacrylate core-shell impact modifier dispersed in a matrix which is mainly poly(methyl methacrylate). Admixing was carried out in two stages; a master batch of 30 phr particle polymer was prepared at a melt and die temperature of 232° C. in the equipment described in Example 169, and the master batch was then re-extruded with more commercial impact-modified acrylic polymer under similar conditions to obtain the final mixture. As a control an untoned version of the commercial impact-modified acrylic polymer was used.

Plaques of these blends and a control were prepared at 3.175 mm thickness by injection molding into an ASTM mold. Conditions were as follows: Temperatures of nozzle, front and rear barrels were all at 232° C.; speed was 200 rpm; die temperature was 93° C.; the injection cycle was 15 sec at 300 MegaPascals. Impact and modulus data were measured by standard ASTM methods.

TABLE XXVI-A

Impact-Modified Poly(Methyl Methacrylate) and Polymer Particles Optical Properties

| Example No. | Particulate Polymer, phr | Total Luminous Transmittance % | Yellowness Index | Haze % |
|---|---|---|---|---|
| 185-control | 0 | 89.0 | −0.56 | 1.9 |
| 186 | 3 | 87.7 | +4.85 | 97.3 |
| 187 | 5 | 87.2 | +6.08 | 97.8 |
| 188 | 10 | 81.7 | +9.04 | 98.1 |

TABLE XXVI-B

Impact-Modified Poly(Methyl Methacrylate) and Polymer Particles Physical Properties

| Example No. | Particulate Polymer, phr | Notched Izod, kg.cm./cm A | B | Tensile modulus, MegaPascals |
|---|---|---|---|---|
| 185-control | 0 | 5.4 | 2.7 | 1930 |
| 186 | 3 | 5.4 | 3.3 | 1906 |
| 187 | 5 | 5.4 | 3.3 | 1913 |
| 188 | 10 | 5.4 | 3.8 | 1791 |

Condition A: at 223° C.; condition B: at 0° C.

EXAMPLE 189

The following example illustrates an alternative preparation of uniformly sized polymer particles within the size range of the present invention. The particles are styrene-5% divinylbenzene copolymer having 5 μm particle size and narrow particle size distribution. Emulsifier A was sodium dodecylbenzene sulfonate. Emulsifier B. was the ammonium salt of sulfated nonylphenoxypoly(ethoxy)ethanol. Emulsifier C was bis(tridecyl) sodium sulfosuccinate. Water refers to deionized water. Particle sizes were measured by Nanosizer when below one μm; larger particle sizes were measured by optical microscope, uniformity being judged by examination of photographs.

Step 1:

In a suitable reactor equipped with a means for heating the exterior, a means for addition of initiator and monomer, a nitrogen sweep, a reflux condenser, and stirrer was prepared a emulsion copolymer of butyl acrylate/methyl metacrylate/methacrylic acid 50/48/2, initiated with ammonium persulfate at temperatures above 80° C., and with 0.6% Emulsifier A. The particle size was essentially monodisperse and measured as 0.147 μm.

Step 2:
To a reactor equipped as in Step 1 was charged:

| Emulsion of Step 1 | 55.6 parts |
|---|---|
| Water | 2306 |

The mix was heated with stirring to 80° C., and 5 parts sodium persulfate in 40 parts water added. After 10 minutes, a mixture of 420 parts butyl methacrylate, 580 parts of methyl methacrylate, and 20 parts of methacrylic acid were added uniformly over a two hour period; stirring was at 140 rpm. The monomer feed line was rinsed with 30 parts of water, the reaction temperature was maintained at 80° C. for 40 minutes more, and the mixture was cooled and filtered. A narrow particle size emulsion of 0.514 μm was obtained.

Step 3:
In a monomer feed tank was prepared an emulsion of:

| Water | 300 parts |
|---|---|
| Emulsifier B | 9 |
| Styrene | 540 |
| Butyl acrylate | 333 |
| Allyl methacrylate | 27 |
| t-Butyl peroctoate | 9 |

To a reactor equipped with stirrer, reflux condenser, nitrogen sparge inlet, and two means for introducing feed streams was charged:

| Water | 1700 parts |
|---|---|
| Ammonia, aqueous | 5 |
| Magnesium p-nitroso-phenolate, 0.5% solution | 15.2 |

The contents of the reactor were heated with stirring under nitrogen to 85° C. The following was added under a blanket of nitrogen:

| Emulsion of Step 2 | 753.5 parts |
|---|---|
| Water rinse | 24.3 |

The monomer emulsion was then added uniformly over a period of 4 hours at a stirring rate of 120 rpm, the temperature being maintained at 85° C. On completion of monomer feed, the monomer emulsion tank was rinsed with 30 parts water. The polymerization mixture was maintained at 85° C. throughout the feed and for one hour after completion of the feed; it was then cooled and filtered through a 45 μm screen. The particle size awas 0.74 micrometers.

Step 4:
In a monomer feed tank was prepared an emulsion of:

| Water | 300 parts |
|---|---|
| Emulsifier B | 9 |
| Styrene | 540 |
| Butyl acrylate | 333 |
| Allyl methacrylate | 27 |
| t-Butyl peroctoate | 9 |

To a reactor equipped with stirrer, reflux condenser, nitrogen sparge inlet, and two means for introducing feed streams was charged:

| Water | 1690 parts |
|---|---|
| Ammonia, aqueous | 5 |
| Magnesium p-nitroso-phenolate, 0.5% solution | 15.2 |

The contents of the reactor were heated with stirring under nitrogen to 85° C. The following was added under a blanket of nitrogen:

| Emulsion of Step 3 | 439.4 parts |
|---|---|
| Water rinse | 27.4 |

The monomer emulsion was then added uniformly over a period of 3 hours at a stirring rate of 120 rpm, the temperature being maintained at 85° C. On completion of monomer feed, the monomer emulsion tank was rinsed with 30 parts water. The polymerization mixture was maintained at 85° C. throughout the feed and for 1 hour after completion of the feed, cooled; it was then filtered through a 45 μm screen. The particle size was 0.96 μm.

Step 5:
In a monomer feed tank was prepared an emulsion of:

| Water | 300 parts |
|---|---|
| Emulsifier B | 2.7 |
| Styrene | 540 |
| Butyl acrylate | 333 |
| Allyl methacrylate | 27 |
| t-Butyl peroctate | 9 |

In a separate feed tanks was prepared a mixture of:

| Emulsifier C | 9 |
|---|---|
| Water | 105 |

To a reactor equipped with stirrer, reflux condenser, nitrogen sparge inlet, and two means for introducing feed streams was charged:

| Water | 1670 parts |
|---|---|
| Ammonia, aqueous | 5 |
| Magnesium p-nitroso-phenolate, 0.5% solution | 15.2 |

The contents of the reactor were heated with stirring under nitrogen to 85° C. The following was added under a blanket of nitrogen:

| Emulsion of Step 4 | 478.8 parts |
|---|---|
| Water Rinse | 20 |

The monomer emulsion was then added uniformly over a period of 4 hours at a stirring rate of 120 rpm, the temperature being maintained at 85° C. After 2.5 hours, the feed-diluted Emulsifier C was added over a period of 2 hours. On completion of the feeds, the monomer emulsion tank was rinsed with 30 parts of water, and the tank containing Emulsifier C were rinsed with 20 parts of water, both of which rinses were added to the reaction mixture. The polymerization mixture was maintained at 85° C. throughout the feeds and for 0.5 hours after completion of all feeds, after which the mixture was cooled and filtered through a 45 μm screen. The particle size was 1.25 μm.

The polymer dispersion was added to poly(vinyl chloride) in the manner of Examples 122–136. The effect on surface reflectance was almost identical to that noted in Example 127 of that series.

| Example | Level of Additive | Hunterlab Gloss 60° | 85° |
|---|---|---|---|
| A | none (control) | 73.4 | 80.5 |
| B | 1.0 | 37.3 | 47.5 |
| C | 2.0 | 33.8 | 45.6 |

It is expected that one or two additional repetitions of Step 5 will bring the particle size into a range which will match the values for a commercial flatting agent at equivalent or lower use levels, and reach the desired values of particle size range while maintaining particle size range and uniformity.

We claim:

1. A process for preparing a thermoplastic polymer composition comprising thermoplastic matrix polymer and, distributed throughout the thermoplastic matrix polymer, substantially spherical core-shell polymer particles, said particles having an average diameter of from 2 to 15 μm and a particle size distribution such that at least 90% by weight of the particles fall within ±20% of the average particle diameter, a core of rubbery alkyl acrylate polymer and one or more shells, the outer shell of which is compatible with the matrix polymer, wherein the process comprises:

A) polymerizing a first aqueous emulsion of the one or more monomers which, when polymerized, produce a particulate composition comprising polymer particles;

B) performing one or more times the steps of
   1) swelling the particles of the particulate composition produced in A), or if appropriate the particles of B2), with one or more monomers, and
   2) polymerizing the swelling monomer within the particles until all of the monomers have been polymerized; and
   c) polymerizing one or more monomers which are polymerizable to form a polymer compatible with the matrix polymer to produce the core-shell polymer particles, and blending the resulting core-shell polymer particles, in an amount of 0.1 to 40% by weight of the total composition, with said thermoplastic matrix polymer.

2. The process of claim 1 wherein the polymerization of step A) is conducted under conditions that form the emulsion polymer as an easily swellable oligomer.

3. The process of claim 1 wherein one or more polymerizations of step B2) are conducted under conditions that form a readily swellable oligomer from the swelling monomer.

4. The process of claim 1 wherein said spherical core-shell polymer particles comprise a rubbery alkyl acrylate polymer, the alkyl group having from 2 to 8 carbon atoms, copolymerized with 0 to about 10% crosslinker and 0 to about 10% graftlinker, based on the total weight of the particles.

5. The process of claim 1 wherein said matrix polymer is substantially amorphous.

6. The process of claim 5 wherein the spherical polymeric particles of step B2), have a refractive index ($n_D^{25}$) within ±0.2 units of the refractive index of the matrix polymer.

7. The process of claim 6 wherein the refractive index of the spherical particles of step B2) is no closer than ±0.003 units of the refractive index of the matrix polymer.

8. The process of claim 1 wherein the process further comprises performing one or more steps of
   C1) suspending the core polymer particles in a second aqueous monomer emulsion, the monomers of which are polymerizable to form a polymer compatible with the matrix polymer, and
   C2) polymerizing onto the core polymer particles a polymer shell from the monomer in the second emulsion.

9. The process of claim 8 wherein the spherical polymer particles of step B2 have a refractive index within ±0.2 units of the refractive index of the matrix polymer.

* * * * *